US007039413B2

(12) United States Patent
Masuda et al.

(10) Patent No.: US 7,039,413 B2
(45) Date of Patent: May 2, 2006

(54) MOBILE STATION TRANSFER CONTROL SYSTEM, CELL TRANSFER CONTROL METHOD, MOBILE STATION, CELL TRANSFER CONTROL METHOD AT MOBILE STATION, CELL TRANSFER CONTROL PROGRAM, CONTROL APPARATUS, AND ALLOCATING METHOD OF COMMUNICATION RESOURCES

(75) Inventors: Masafumi Masuda, Yokosuka (JP); Akihiro Maebara, Yokohama (JP); Hidetoshi Yazaki, Yokosuka (JP); Hiromu Niiyama, Yokohama (JP); Takashi Nagano, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 444 days.

(21) Appl. No.: 10/277,755

(22) Filed: Oct. 23, 2002

(65) Prior Publication Data

US 2003/0087637 A1 May 8, 2003

(30) Foreign Application Priority Data

Oct. 24, 2001 (JP) ............................ P2001-326826
Dec. 6, 2001 (JP) ............................ P2001-373358

(51) Int. Cl.
*H04Q 7/20* (2006.01)

(52) U.S. Cl. ................ 455/446; 455/412.2; 455/435.2; 455/525

(58) Field of Classification Search ............. 455/412.1, 455/412.2, 422.1, 446, 507, 517, 550.1, 437, 455/436, 442, 525, 435.1, 435.2, 434, 443, 455/444, 524
See application file for complete search history.

(56) References Cited

U.S. PATENT DOCUMENTS

| 5,862,480 | A | | 1/1999 | Wild et al. | |
| 5,983,097 | A | * | 11/1999 | Kakinuma et al. | ........ 455/422.1 |
| 6,134,431 | A | * | 10/2000 | Matsumoto et al. | ........ 455/411 |
| 6,138,018 | A | * | 10/2000 | Pashtan et al. | .......... 455/435.2 |
| 6,334,052 | B1 | * | 12/2001 | Nordstrand | .................. 455/411 |
| 6,363,255 | B1 | * | 3/2002 | Kuwahara | ................. 455/456.5 |
| 6,745,021 | B1 | * | 6/2004 | Stevens | ................... 455/404.1 |

FOREIGN PATENT DOCUMENTS

| CN | 1219091 A | 6/1999 |
| EP | 0 844 798 | 5/1998 |
| JP | 7-87544 | 3/1995 |
| WO | WO 98/39940 | 9/1998 |

* cited by examiner

*Primary Examiner*—Tilahun Gesesse
*Assistant Examiner*—John J. Lee
(74) *Attorney, Agent, or Firm*—Oblon, Spivak, McClelland, Maier & Neustadt, P.C.

(57) ABSTRACT

While a plurality of cellular mobile communication systems have their respective service areas regionally overlapping each other in part, a mobile station is configured to perform a standby for calling or communication while selecting one of the plural systems in the overlapping areas, and is arranged as follows: the mobile station preliminarily stores cell information notified of by a base station and indicating whether the mobile station is transferable to each surrounding cell while maintaining the current system; when the arrival of transfer timing to a surrounding cell is detected, the mobile station extracts the information about the pertinent cell and judges whether the surrounding cell is a transferable cell, based on the cell information; when the surrounding cell is a transferable cell, the mobile station transfers to the surrounding cell; when the surrounding cell is not a transferable cell, the mobile station directly transfers to a cell of a different system. This makes it feasible to decrease communication down time and decrease power consumption of the mobile station.

16 Claims, 13 Drawing Sheets

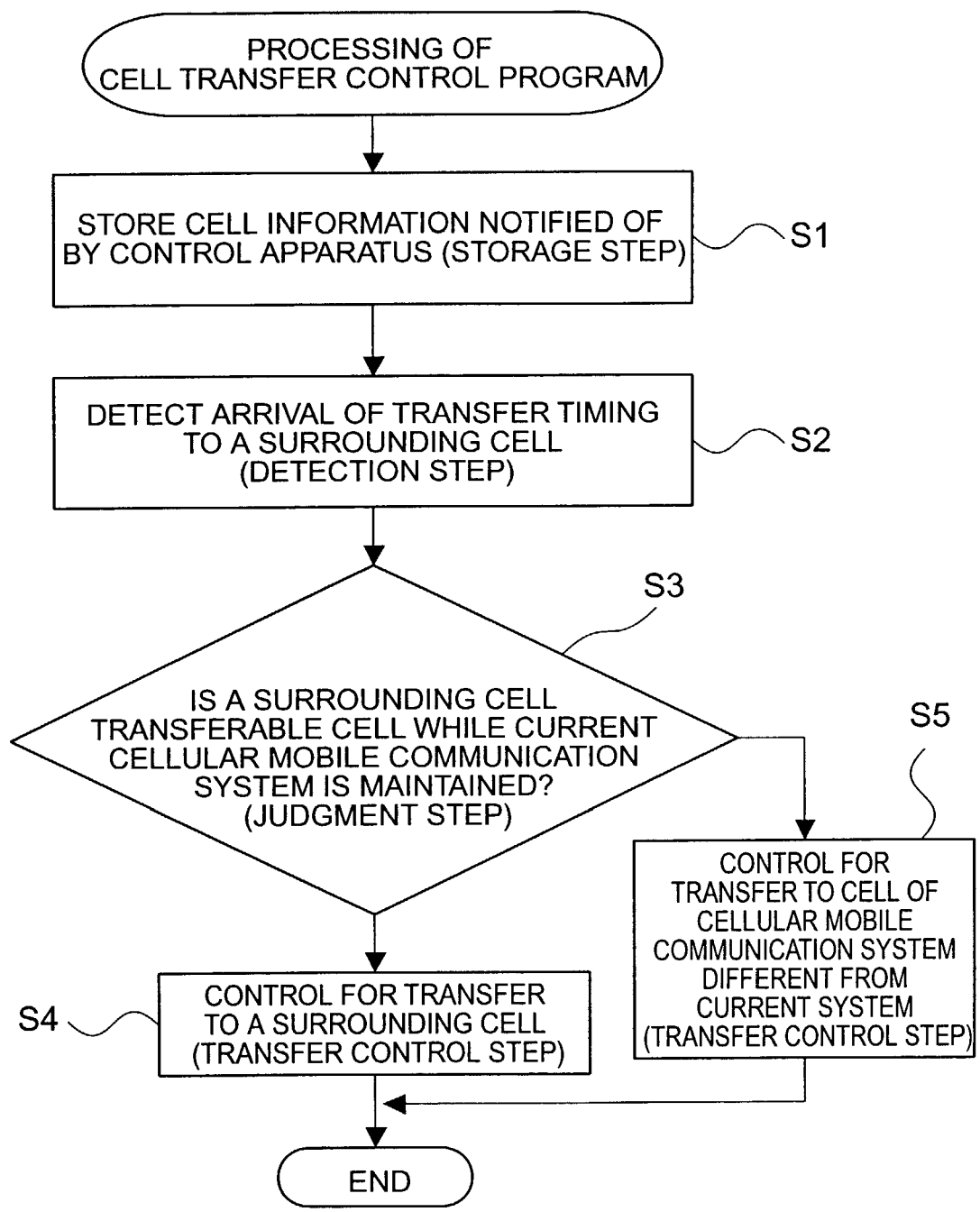

MOBILE STATION TRANSFER CONTROL SYSTEM, CELL TRANSFER CONTROL METHOD, MOBILE STATION, CELL TRANSFER CONTROL METHOD AT MOBILE STATION, CELL TRANSFER CONTROL PROGRAM, CONTROL APPARATUS, AND ALLOCATING METHOD OF COMMUNICATION RESOURCES

BACKGROUND OF THE INVENTION

1. Field of the Invention

The present invention relates to a mobile station transfer control system in which a mobile station is able to utilize a plurality of cellular mobile communication systems service areas of which regionally overlap each other at least in part, a cell transfer control method, a mobile station, a cell transfer control method at a mobile station, a cell transfer control program, control apparatus, and an allocating method of communication resources.

2. Related Background Art

The following cell transfer method is among cell transfer methods of a mobile station in a cellular mobile communication system. A mobile station on standby or in communication in a certain cell monitors one or more surrounding cells as potential cell transfer targets. The monitoring of surrounding cells herein means measuring reception levels of pilot channels set for the respective cells. When a reception level of a certain pilot channel becomes higher over a predetermined value than the reception level of the channel on standby or in communication, the mobile station transfers to a cell corresponding to the pilot channel. Typical examples of the cellular mobile communication systems employing such cell transfer are the 800 MHz system and the 1500 MHz system in the digital automobile telephone system (Personal Digital Cellular: PDC) commercially served in Japan at present.

The PDC is generally operated in operation forms of operating the 800 MHz system and the 1500 MHz system independently of each other, but it is also possible to carry out a scheme of introducing a mobile station transferable between the systems and using the two available systems like one system. This scheme is sometimes substantiated in an operating form in which the aforementioned intersystem-transferable mobile station is allowed to use only cells located in some region out of those provided in a certain system (e.g., the 1500 MHz system) but not allowed to use cells located in the other region. Normally, a mobile station that can use only the 1500 MHz system is allowed to use all the cells.

In this operating form, when the intersystem-transferable mobile station on standby or in communication in a cell allowed to use in the 1500 MHz system moves into a region where only cells not allowed to use exist, control is sometimes carried out so as to make the mobile station transfer to a cell of another available system (e.g., the 800 MHz system), in order to maintain the standby or communication state. The following method is a potential example of execution of such control. Information on whether the intersystem-transferable mobile station can use the cell is broadcast in each cell of the 1500 MHz system. When the intersystem-transferable mobile station is notified of unavailability of a cell after transfer to the cell, it discontinues standby or communication in the pertinent cell and transfers to a cell of the other available system. This permits the intersystem-transferable mobile station to continue the standby or communication, without using the cell not allowed to use.

However, this method requires execution of a transfer process to a cell not used for standby or communication in practice, a synchronization establishing process, and a broadcast message receiving process, and thus raises concerns about increase in communication down time during these processes, increase in power consumption of the mobile station due to the processes, and so on.

In general, a cellular mobile communication system consists of a plurality of mobile stations, and a plurality of base stations each of which is in charge of one or more cells, and these cells constitute a service area in total. Each base station is connected through base-station control and cellular switching equipment to the public switched network. Each mobile station is allowed to establish communication within the service area while moving from cell to cell. As one of techniques applied to the case where a mobile station belonging to a certain cell is to transfer to another cell, there is a method in which the mobile station receives pilot channels from surrounding cells adjacent to the belonging cell of its own and monitors reception levels thereof. When a reception level of a pilot channel becomes higher over a predetermined value than the reception level of the communicating channel, the mobile station notifies the base-station control and/or the cellular switching equipment or the like (the network) of the fact. The base-station control or the like thus notified performs a transfer process for letting the mobile station transfer to a cell issuing the pilot channel of the higher reception level.

There exist a variety of such cellular mobile communication systems, depending upon their service contents, and according to circumstances, there are cases where a plurality of cellular mobile communication systems are simultaneously available in a same area. For example, there is an environment in which the 800 MHz digital automobile telephone system and the 1500 MHz digital automobile telephone system both are available. A scheme employed in this environment is a method in which a mobile station capable of operating in the both cellular mobile communication systems in a certain definite region can accept allocation of communication resources from either of the cellular mobile communication systems (a multi-system available scheme). The definite region is called a "common cell." Specifically, in a cell set as a "common cell, " the communication resources of the communication system thereof are allocated to a mobile station dedicated to the communication system of the cell and to a mobile station capable of operating in the both systems. In a cell (ordinary cell) not set as a "common cell," the communication resources of the communication system thereof are allocated to only a mobile station dedicated to the communication system of the cell. By adopting this scheme, for example, in the case where the communication resources of one system (800 MHz) are running short and where the communication resources of the other system (1500 MHz) still have a margin, it is feasible to switch mobile stations using the system coming short of the resources, into the system with a margin of resources and thus utilize the communication resources effectively and flexibly. A system operator is allowed to determine which zone (cell) should be set as a "common cell," cell by cell.

FIG. 1 is a functional block diagram for searching for a cell as a transfer target (handover destination) of a mobile station in the conventional multi-system available scheme.

The processes illustrated in this functional block diagram are carried out by a control apparatus exercising control over each base station. First, input information received from a mobile station is fed into an input interface 701. This input information includes, for example, an identification number of the mobile station; cell identification codes and reception levels of pilot channels from surrounding cells about a cellular mobile communication system currently used for communication (the 1500 MHz system in the above example); cell identification codes and reception levels of pilot channels from surrounding cells about a cellular mobile communication system not used for communication (the 800 MHz system in the above example); and soon. When the mobile station is a device dedicated to either one cellular mobile communication system, the information about the other cellular mobile communication system is not included in the above-stated input information. Among the input information, the reception levels of the pilot channels are supplied to a cell information analyzer 702, and the cell identification codes to a cell code buffer 703. A cell code filter 704 selects a cell presenting the strongest reception level in the both cellular mobile communication systems and specifies it as a transfer target of the mobile station. A mobile station determiner 705 checks whether the mobile station can operate in the both cellular mobile communication systems. When the mobile station is one dedicated to one cellular mobile communication system, an output interface 708 issues a command to let the mobile station transfer to the cell specified by the cell code filter 704. When the mobile station is one capable of operating in the both cellular mobile communication systems, a common cell/ordinary cell determiner 706 further checks whether the cell as a transfer target is a common cell or an ordinary cell. An information storage 707 coupled to the common cell/ordinary cell determiner 706 stores information about which cell is a common cell. When the result of the check is that the cell as a transfer target is a common cell, the cell specified as a transfer target at the cell code filter 704 is approved as an actual transfer target and the output interface 708 issues an output to allow the transfer to the cell. When the result of the check is that the cell as a transfer target is not a common cell on the other hand, the transfer to the cell is not permitted, and thus the output interface 708 outputs information indicating that there exists no adequate cell. In this case, the mobile station is not allowed to achieve handover before the condition of the cell as a transfer target being a common cell is met.

The technology about the intersystem cell transfer method based on the direct monitor of the different cellular mobile communication systems as described above is disclosed, for example, in Japanese Patent Application "Laid-Open No. HEISEI 07-87544."

In execution of such handover control, however, there arises disadvantage as described below with reference to FIG. 2. Let us suppose that the mobile station MS is a mobile station operable in both first and second cellular mobile communication systems and is under communication with the base station BS1 through use of the communication resources of the first cellular mobile communication system. In the direction of movement of the mobile station MS (on the right side in FIG. 2), there are a base station BS2 (ordinary cell) of the first cellular mobile communication system and a base station BS3 (common cell) of the second cellular mobile communication system. When the mobile station MS arrives at a site P and when a received field intensity from the common cell BS3 is not higher over a predetermined value than a received field intensity from the ordinary cell BS2, the cell of the base station BS2 of the first cellular mobile communication system now under use becomes a potential transfer target at the site P. However, since the cell of the base station BS2 is not a common cell, no handover is made at the mobile station MS operable in the both systems. When the mobile station MS further moves to a site Q, the received field intensity from the common cell BS3 becomes higher over the predetermined value than the received field intensity from the ordinary cell BS2, whereupon the mobile station MS is allowed to make handover to the common cell BS3. Incidentally, if the mobile station MS were a mobile station dedicated to the first cellular mobile communication system, the handover to the cell of the base station BS2 must be achieved at the time of arrival at the site P, based on the comparison between received field intensities from the two base stations BS1, BS2 in the first cellular mobile communication system. However, the handover is not made in practice before arrival at the site Q, because the mobile station MS is one operable in the both systems and the comparison of received field intensities is made between the different systems. As a consequence, there arises concern that the quality of communication (e.g., a reception level or the like) is not satisfactory during the movement of the mobile station MS from the site P to the site Q. Namely, in the case of the mobile station MS operable in the both systems, handover should also have been made at the site P in terms of use of the communication resources of the first cellular mobile communication system.

When the mobile station MS operable in the both systems arrives at the site P, if the received field intensity from the common cell BS3 is higher over the predetermined value than the received field intensity from the ordinary cell BS2, handover will be made to the common cell BS3 at the mobile station MS even if the received field intensity from the present cell BS1 is still strong, because BS3 is the common cell. Incidentally, supposing the mobile station were a mobile station dedicated to the first communication system, no handover would be achieved at the site P but handover must be made to the cell BS2 at the time of arrival at the site Q where the received field intensity from the cell BS2 becomes sufficiently high, based on the comparison between received field intensities from the both base stations BS1, BS2 in the first cellular mobile communication system. However, handover is achieved at the site P in practice, because the mobile station MS is one operable in the both systems and the comparison of received field intensities is made between the different systems. As a consequence, the mobile station MS abandons the communication resources of the first cellular mobile communication system that can be continuously used, and uses the other communication resources, during the movement of the mobile station MS from the site P to the site Q.

In each of the first and second cellular mobile communication systems, the system is designed to utilize the communication resources most effectively and efficiently; therefore, it is preferable to control the handover so that the mobile station operable in the both systems achieves handover under the same condition (i.e., at the same handover place) as the mobile station dedicated to the first cellular mobile communication system, while using the communication resources of the first cellular mobile communication system. However, in the case where the handover place is different from that of the mobile station dedicated to the first cellular mobile communication system as in the above example, there arises concern that the quality of reception degrades, for example, because of failure in ensuring the adequate distance between the cells using the same frequency.

An object of the present invention is to provide a mobile station transfer control system, a cell transfer control method, a mobile station, a cell transfer control method at a mobile station, a cell transfer control program, a control apparatus, and an allocating method of communication resources capable of solving the above problems under the environment where a plurality of cellular mobile communication systems are available, and making improvement in the cell transfer control of the mobile station.

SUMMARY OF THE INVENTION

In order to accomplish the above object, a mobile station transfer control system according to the present invention is a mobile station transfer control system comprising a control apparatus for control over a plurality of cellular mobile communication systems and a mobile station present in a cell under the control of the control apparatus, and constructed in a configuration in which service areas of the respective cellular mobile communication systems regionally overlap each other at least in part, wherein the control apparatus comprises: notifying means for notifying the mobile station of cell information indicating whether the mobile station is transferable to a cell while maintaining a current cellular mobile communication system, about each of surrounding cells located around the present cell, and wherein the mobile station comprises: a cell information storage for storing the cell information about each surrounding cell notified of by the notifying means; detecting means for detecting the arrival of transfer timing from the present cell to a surrounding cell; transfer judging means for, when the detecting means detects the arrival of the transfer timing, judging whether the surrounding cell is a transferable cell to which the mobile station is transferable while maintaining the current cellular mobile communication system, based on the cell information stored in the cell information storage; and transfer control means for performing such control that when the surrounding cell is the transferable cell, the mobile station transfers to the surrounding cell and that when the surrounding cell is not the transferable cell, the mobile station transfers to a cell of a cellular mobile communication system different from the current cellular mobile communication system.

Namely, the mobile station transfer control system according to the present invention comprises the control apparatus for control over the plurality of cellular mobile communication systems and the mobile station present in a cell under control of the control apparatus and is constructed in the configuration in which the service areas of the respective cellular mobile communication systems regionally overlap each other at least in part. The plurality of cellular mobile communication systems as selection objects herein are assumed to include systems of different frequency bands in an identical communication scheme (e.g., PDC, wideband CDMA, etc.).

In the mobile station transfer control system described above, the control apparatus makes the notifying means notify the mobile station of the cell information indicating whether the mobile station is transferable to a cell while maintaining the current cellular mobile communication system, about each of the surrounding cells located around the present cell.

In conjunction therewith, the mobile station stores the cell information about each surrounding cell thus notified of, in the cell information storage. When the detecting means detects the arrival of the transfer timing from the present cell to the surrounding cell, the mobile station makes the judging means judge whether the surrounding cell is the transferable cell to which the mobile station is transferable while maintaining the current cellular mobile communication system, based on the cell information stored in the cell information storage. According to the result of the judgment, the transfer control means performs such control that when the surrounding cell is the transferable cell, the mobile station transfers to the surrounding cell and that when the surrounding cell is not the transferable cell, the mobile station transfers to a cell of the cellular mobile communication system different from the current cellular mobile communication system.

As described, the mobile station makes a judgment on whether the surrounding cell is the transferable cell to which the mobile station is transferable while maintaining the current cellular mobile communication system, based on the cell information, prior to execution of the transfer to the surrounding cell, and, based on the result of the judgment, the mobile station is able to securely perform the transfer to the cell used for standby or communication in practice and the direct transfer to the cell of the different cellular mobile communication system, whereby it is feasible to avoid waste processing such as the transfer process to a cell not used for standby or communication in practice, the synchronization establishing process, and the broadcast message receiving process and to reduce the communication down time and the power consumption of the mobile station.

Preferably, the transfer control means of the mobile station is configured to perform such control that when the surrounding cell is not the transferable cell, the mobile station transfers to a cell with the highest reception level out of cells of the different cellular mobile communication system. This allows the mobile station to continue the mobile communication under the environment of a better reception level on the occasion of carrying out the direct transfer to the cell of the different cellular mobile communication system.

It is noted that the invention as associated with the above-stated mobile station transfer control system can also be described as an aspect of the invention associated with a cell transfer control method, as an aspect of the invention associated with a mobile station, as an aspect of the invention associated with a cell transfer control method at a mobile station, and as an aspect of the invention associated with a cell transfer control program as presented below. These aspects are based on the substantially identical technical concept and present much the same operation and effect.

Specifically, a cell transfer control method according to the present invention is a cell transfer control method in a mobile station transfer control system comprising a control apparatus for control over a plurality of cellular mobile communication systems, and a mobile station present in a cell under the control of the control apparatus, and constructed in a configuration in which service areas of the respective cellular mobile communication systems regionally overlap each other at least in part, the cell transfer control method comprising: a notification step wherein the control apparatus notifies the mobile station of cell information indicating whether the mobile station is transferable to a cell while maintaining a current cellular mobile communication system, about each of surrounding cells located around the present cell; a storage step wherein the mobile station stores the cell information about each surrounding cell notified of by the control apparatus, in a cell information storage; a detection step wherein the mobile station detects the arrival of transfer timing from the present cell to a surrounding cell; a judgment step where in when the arrival of the transfer timing is detected, the mobile station judges whether the surrounding cell is a transferable cell to which the mobile station is transferable while maintaining the current cellular mobile communication system, based on the cell information stored in the cell information storage; and a transfer control step wherein when the surrounding cell is the transferable cell, the mobile station transfers to the surrounding cell and wherein when the surrounding cell is not the transferable cell, the mobile station transfers to a cell of a cellular mobile communication system different from the current cellular mobile communication system.

More preferably, the transfer control step is to perform such control that when the surrounding cell is not the transferable cell, the mobile station transfers to a cell with the highest reception level out of cells of the different cellular mobile communication system.

A mobile station according to the present invention is a mobile station comprising: a cell information storage for storing cell information notified of by a control apparatus for control over a plurality of cellular mobile communication systems service areas of which regionally overlap each other at least in part, the cell information indicating whether the mobile station is transferable to a cell while maintaining a cellular mobile communication system of the control apparatus, about each of surrounding cells; detecting means for detecting the arrival of transfer timing from a present cell to a surrounding cell; transfer judging means for, when the detecting means detects the arrival of the transfer timing, judging whether the surrounding cell is a transferable cell to which the mobile station is transferable while maintaining the current cellular mobile communication system, based on the cell information stored in the cell information storage; and transfer control means for performing such control that when the surrounding cell is the transferable cell, the mobile station transfers to the surrounding cell and that when the surrounding cell is not the transferable cell, the mobile station transfers to a cell of a cellular mobile communication system different from the current cellular mobile communication system.

More preferably, the transfer control means is configured to perform such control that when the surrounding cell is not the transferable cell, the mobile station transfers to a cell with the highest reception level out of cells of the different cellular mobile communication system.

A cell transfer control method at a mobile station according to the present invention is, as shown in FIG. 3, a cell transfer control method at a mobile station, the cell transfer control method comprising: a storage step S1 of storing cell information notified of by a control apparatus for control over a plurality of cellular mobile communication systems service areas of which regionally overlap each other at least in part, the cell information indicating whether the mobile station is transferable to a cell while maintaining a cellular mobile communication system of the control apparatus, about each of surrounding cells; a detection step S2 of detecting the arrival of transfer timing from a present cell to a surrounding cell; a judgment step S3 of, when the arrival of the transfer timing is detected in the detection step S2, judging whether the surrounding cell is a transferable cell to which the mobile station is transferable while maintaining the current cellular mobile communication system, based on the stored cell information; and a transfer control step S4, S5 of performing such control that when the surrounding cell is the transferable cell, the mobile station transfers to the surrounding cell (S4) and that when the surrounding cell is not the transferable cell, the mobile station transfers to a cell of a cellular mobile communication system different from the current cellular mobile communication system (S5).

Preferably, the transfer control step is to perform such control that when the surrounding cell is not the transferable cell, the mobile station transfers to a cell with the highest reception level out of cells of the different cellular mobile communication system.

A cell transfer control program according to the present invention is configured to make a built-in computer at the mobile station execute each of the steps (S1 to S5 in FIG. 3) in the above "aspect of the invention associated with the cell transfer control method at the mobile station."

One of the features of the present invention is that a control apparatus comprises "notifying means" described below. Namely, a control apparatus according to the present invention comprises notifying means for notifying a mobile station present in a cell under control thereof, of cell information indicating whether the mobile station is transferable to a cell while maintaining a current cellular mobile communication system, about each of surrounding cells.

In order to accomplish the above object, a mobile station transfer control system according to the present invention is a mobile station transfer control system comprising a control apparatus for control over a plurality of cellular mobile communication systems, and a mobile station present in a cell under the control of the control apparatus, the mobile station being classified either as a dedicated mobile station set to be able to utilize only service of one cellular mobile communication system or as a common mobile station set to be able to utilize service of two or more cellular mobile communication systems; and constructed in a configuration in which service areas of the respective cellular mobile communication systems regionally overlap each other at least in part, the mobile station transfer control system comprising: control apparatus for performing such control that in a common cell set to be able to offer service to both the dedicated mobile station and the common mobile station, communication resources of a cellular mobile communication system served therein are allocated to each of the dedicated mobile station and the common mobile station and that in an ordinary cell not set as the common cell, communication resources of a cellular mobile communication system served in the ordinary cell are allocated to only the dedicated mobile station of the cellular mobile communication system; first determining means for, when the mobile station transfers to another cell, determining a transfer target cell as a transfer target of the mobile station within a current cellular mobile communication system in which the mobile station utilizes service thereof; judging means for judging whether the mobile station is a common mobile station and whether the transfer target cell determined by the first determining means is an ordinary cell; and second determining means for, when the mobile station is a common mobile station and when the transfer target cell determined by the first determining means is an ordinary cell, determining a common cell of a cellular mobile communication system different from the current cellular mobile communication system, as a new transfer target cell.

In the above mobile station transfer control system, the control apparatus performs such control that in a common cell set to be able to offer the service to both the dedicated mobile station and the common mobile station, the communication resources of the cellular mobile communication system served therein are allocated to each of the dedicated mobile station and the common mobile station and that in an ordinary cell, the communication resources of the cellular mobile communication system are allocated to only the dedicated mobile station of the cellular mobile communication system served in the ordinary cell. When the mobile station transfers to another cell in the above environment, the first determining means determines a transfer target cell as a transfer target of the mobile station within the current cellular mobile communication system the service of which is utilized by the mobile station.

Then the judging means judges whether the mobile station is a common mobile station and whether the transfer target cell is an ordinary cell. When the mobile station is a common mobile station and when the transfer target cell is an ordinary cell, the second determining means determines a common cell of the cellular mobile communication system different from the current cellular mobile communication system, as a new transfer target cell.

The present invention is characterized in that in the first determination of the transfer target cell, the first determining means determines the transfer target cell within the current cellular mobile communication system, different from the determination of the transfer target cell between the cellular mobile communication systems as in the prior art.

In general, the system is designed so as to be able to use the communication resources most effectively and efficiently in each cellular mobile communication system. When the first determination of the transfer target cell is arranged to determine the transfer target cell within the current cellular mobile communication system, it is thus feasible to solve the problem in the prior art that handover is made at an inappropriate place in terms of effective utilization of the communication resources, and to implement such control that the common mobile station achieves handover under the same condition (i.e., at the same handover place) as the dedicated mobile station. This makes it feasible to secure the adequate distance between cells using the same frequency and maintain the satisfactory reception quality at the mobile station during handover periods.

The above first determining means, second determining means, and judging means may be constructed as elements separated from the control apparatus, or may be incorporated in the control apparatus. The latter configuration can be described as an aspect of the invention associated with a control apparatus below and presents much the same effect as the aspect of the invention associated with the above mobile station transfer control system.

A control apparatus according to the present invention is a control apparatus for allocating communication resources to a mobile station, the mobile station being classified either as a dedicated mobile station set to be able to utilize only service of one cellular mobile communication system out of a plurality of cellular mobile communication systems service areas of which regionally overlap each other at least in part or as a common mobile station set to be able to utilize service of two or more cellular mobile communication systems, the control apparatus comprising: control means for performing such control that in a common cell set to be able to offer service to both the dedicated mobile station and the common mobile station, communication resources of a cellular mobile communication system served therein are allocated to each of the dedicated mobile station and the common mobile station and that in an ordinary cell not set as the common cell, communication resources of a cellular mobile communication system served in the ordinary cell are allocated to only the dedicated mobile station of the cellular mobile communication system; first determining means for, when the mobile station transfers to another cell, determining a transfer target cell as a transfer target of the mobile station within a current cellular mobile communication system in which the mobile station utilizes service thereof; judging means for judging whether the mobile station is a common mobile station and whether the transfer target cell determined by the first determining means is an ordinary cell; and second determining means for, when the mobile station is a common mobile station and when the transfer target cell determined by the first determining means is an ordinary cell, determining a common cell of a cellular mobile communication system different from the current cellular mobile communication system, as a new transfer target cell.

The above control apparatus may be comprised of a control section common to at least two cellular mobile communication systems, or may be comprised of control sections of the respective cellular mobile communication systems for allocating communication resources of the respective cellular mobile communication systems.

A sequence of operation in the above mobile station transfer control system can also be described as an aspect of the invention associated with an allocating method of communication resources below. Namely, an allocating method of communication resources according to the present invention is an allocating method of communication resources in a mobile station transfer control system comprising a control apparatus for control over a plurality of cellular mobile communication systems, and a mobile station present in a cell under the control of the control apparatus, the mobile station being classified either as a dedicated mobile station set to be able to utilize only service of one cellular mobile communication system or as a common mobile station set to be able to utilize service of two or more cellular mobile communication systems; and constructed in a configuration in which service areas of the respective cellular mobile communication systems regionally overlap each other at least in part and in which the control apparatus performs such control that in a common cell set to be able to offer a service to both the dedicated mobile station and the common mobile station, communication resources of a cellular mobile communication system served therein are allocated to each of the dedicated mobile station and the common mobile station and that in an ordinary cell not set as the common cell, communication resources of a cellular mobile communication system served in the ordinary cell are allocated to only the dedicated mobile station of the cellular mobile communication system, the method comprising: a transfer request step wherein the mobile station utilizing service of a first cellular mobile communication system sends a request for transfer to another cell, to the control apparatus; a first determination step wherein the control apparatus determines a transfer target cell as a transfer target of the mobile station within the first cellular mobile communication system; a judgment step wherein the control apparatus judges whether the mobile station is a common mobile station and whether the transfer target cell determined in the first determination step is an ordinary cell; a second determination step wherein when the mobile station is a common mobile station and when the transfer target cell determined in the first determination step is an ordinary cell, the control apparatus determines a common cell of a cellular mobile communication system different from the first cellular mobile communication system, as a new transfer target cell; and a different system resources allocation step wherein the control apparatus allocates communication resources of the cellular mobile communication system of the new transfer target cell to the mobile station.

According to the aspect of the invention associated with the allocating method of communication resources, the initial, first determining step is to determine the transfer target cell within the current cellular mobile communication system (the first cellular mobile communication system), different from the determination of the transfer target cell between the cellular mobile communication systems as in the prior art, whereby it is feasible to solve the problem in the prior art that handover is made at an inappropriate place in terms of effective utilization of communication resources, and to implement such control that the common mobile station achieves handover under the same condition (i.e., at the same handover place) as the dedicated mobile station. This makes it feasible to secure the adequate distance between cells using the same frequency and maintain the good reception quality at the mobile station during handover periods.

In the aspect of the invention associated with the allocating method of communication resources, preferably, the method further comprises an identical system resources allocation step wherein when the mobile station is not a common mobile station or when the transfer target cell determined in the first determination step is not an ordinary cell, the control apparatus continuously allocates communication resources of the first cellular mobile communication system to the mobile station.

Incidentally, a mobile station transfer control system according to the present invention may also be constructed in the following configuration comprehensively including the above-described components. Namely, a mobile station transfer control system according to the present invention is a mobile station transfer control system comprising a control apparatus for control over a plurality of cellular mobile communication systems, and a mobile station present in a cell under the control of the control apparatus, the mobile station being classified either as a dedicated mobile station set to be able to utilize only service of one cellular mobile communication system or as a common mobile station set to be able to utilize service of two or more cellular mobile communication systems; and constructed in a configuration in which service areas of the respective cellular mobile communication systems regionally overlap each other at least in part, wherein the control apparatus comprises: notifying means for notifying the mobile station of cell information indicating whether the mobile station is transferable to a cell while maintaining a current cellular mobile communication system, about each of surrounding cells located around the present cell; control means for performing such control that in a common cell set to be able to offer service to both the dedicated mobile station and the common mobile station, communication resources of a cellular mobile communication system served therein are allocated to each of the dedicated mobile station and the common mobile station and that in an ordinary cell not set as the common cell, communication resources of a cellular mobile communication system served in the ordinary cell are allocated to only the dedicated mobile station of the cellular mobile communication system; first determining means for, when the mobile station transfers to another cell, determining a transfer target cell as a transfer target of the mobile station within a current cellular mobile communication system in which the mobile station utilizes service thereof; judging means for judging whether the mobile station is a common mobile station and whether the transfer target cell determined by the first determining means is an ordinary cell; and second determining means for, when the mobile station is a common mobile station and when the transfer target cell determined by the first determining means is an ordinary cell, determining a common cell of a cellular mobile communication system different from the current cellular mobile communication system, as a new transfer target cell; and wherein the mobile station comprises: a cell information storage for storing the cell information about each surrounding cell notified of by the notifying means; detecting means for detecting the arrival of transfer timing from the present cell to a surrounding cell; transfer judging means for, when the detecting means detects the arrival of the transfer timing, judging whether the surrounding cell is a transferable cell to which the mobile station is transferable while maintaining the current cellular mobile communication system, based on the cell information stored in the cell information storage; and transfer control means for performing such control that when the surrounding cell is the transferable cell, the mobile station transfers to the surrounding cell and that when the surrounding cell is not the transferable cell, the mobile station transfers to a cell of a cellular mobile communication system different from the current cellular mobile communication system.

BRIEF DESCRIPTION OF THE DRAWINGS

FIG. 3 is a flowchart showing the processing of the cell transfer control method at the mobile station and the cell transfer control program according to the present invention.

DESCRIPTION OF THE PREFERRED EMBODIMENTS

Various embodiments according to the present invention will be described below with reference to the drawings.

[First Embodiment]

Figure 4A:
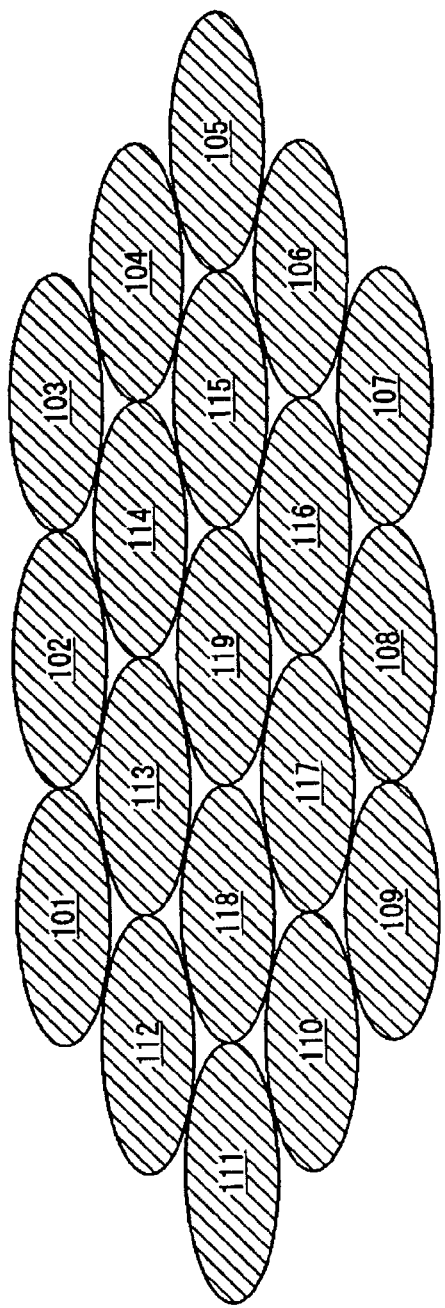
FIG. 4A is a schematic diagram of the service area of the cellular mobile communication system A.
Figure 4B:
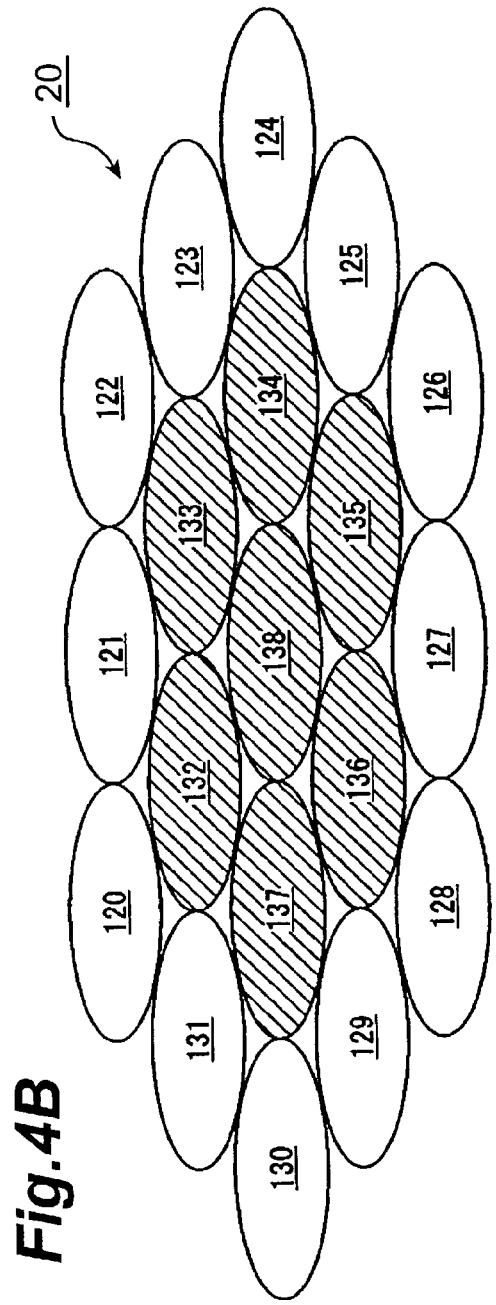
FIG. 4B is a schematic diagram of the service area of the cellular mobile communication system B.

In the first embodiment a system A and a system B are present as a plurality of cellular mobile communication systems, and a configuration example of service areas in the respective systems is presented in FIG. 4A and FIG. 4B. In FIG. 4A, cells 101 to 119 are cells belonging to the system A and constitute the service area 10 of the system A. In FIG. 4B, cells 120 to 138 are cells belonging to the system B different from the system A, and constitute the service area 20 of the system B. Here a mobile station transferable between the system A and the system B (which will be referred to hereinafter as a "common mobile station") is put in place. In the present embodiment, however, cells of the system B that the common mobile station can utilize are limited to the cells 132 to 138 hatched in FIG. 4B. Namely, cells available for the mobile station allowed to utilize only the system A (a dedicated mobile station to the system A) are the cells 101 to 119; cells available for a mobile station allowed to utilize only the system B (a dedicated mobile station to the system B) are the cells 120 to 138; and cells available for the common mobile station are the cells 101 to 119 and the cells 132 to 138.

Figure 5:
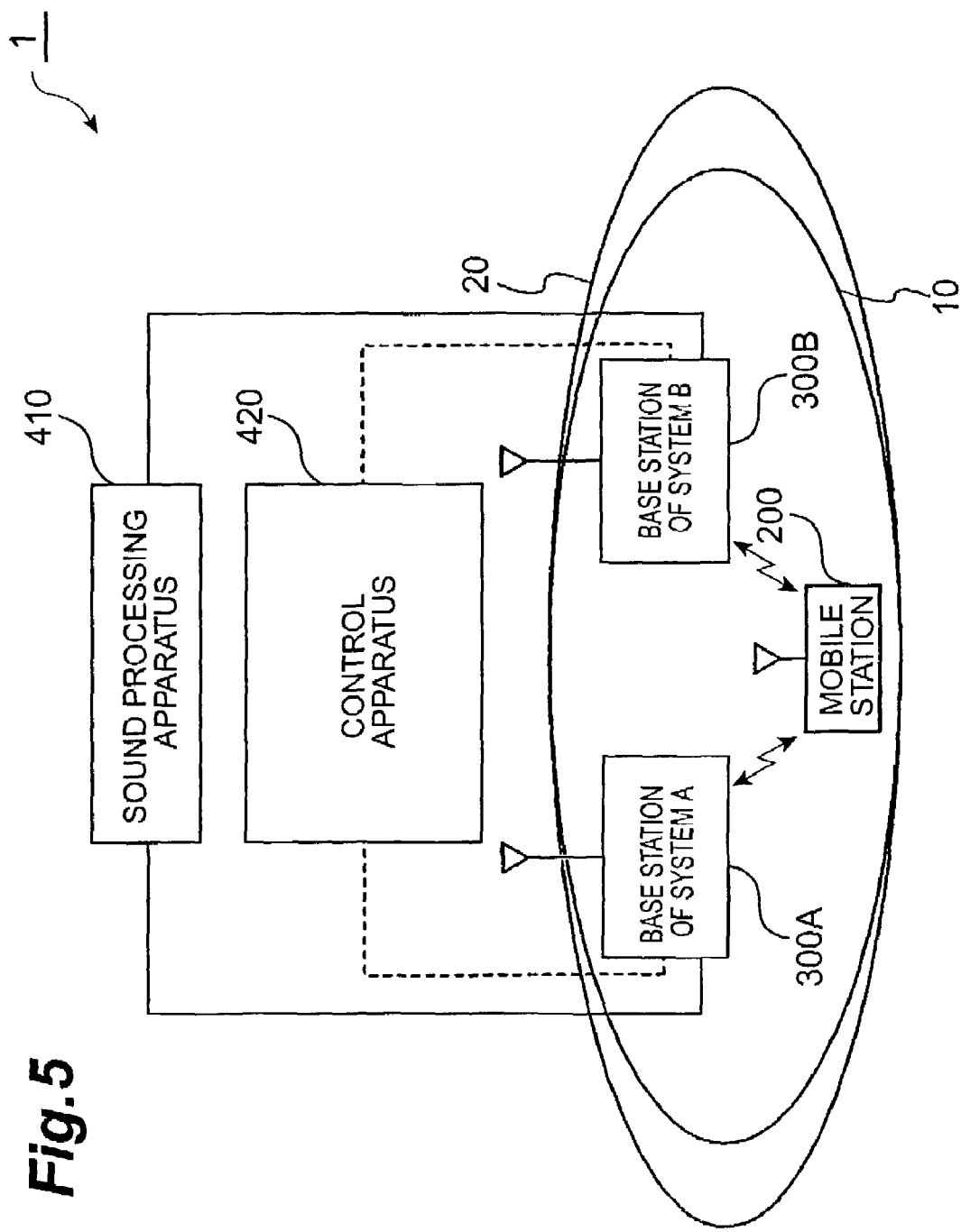
FIG. 5 is a diagram showing the principal elements in the mobile station transfer control system.

FIG. 5 is a diagram showing the principal elements in the mobile station transfer control system 1. FIG. 5 shows a mobile station 200, a base station 300A of the system A, a base station 300B of the system B, and a control apparatus 420 and a sound processing apparatus 410 for controlling these two base stations. The control apparatus 420 and the sound processing apparatus 410 are further connected to the unrepresented cellular switching equipment and network such as the public switched network or the like. In the drawing the solid lines mainly indicate paths of communication signals, and dashed lines mainly indicate paths of control signals. Although the control apparatus 420 and/or the sound processing apparatus 410 (the control apparatus or the like) is depicted in the form common to the systems A, B in FIG. 5, they may be provided for each of the systems. In that case, however, the control apparatus or the like must be configured to be able to communicate with each other, for example, about a cell as a transfer target of each mobile station.

Figure 6:
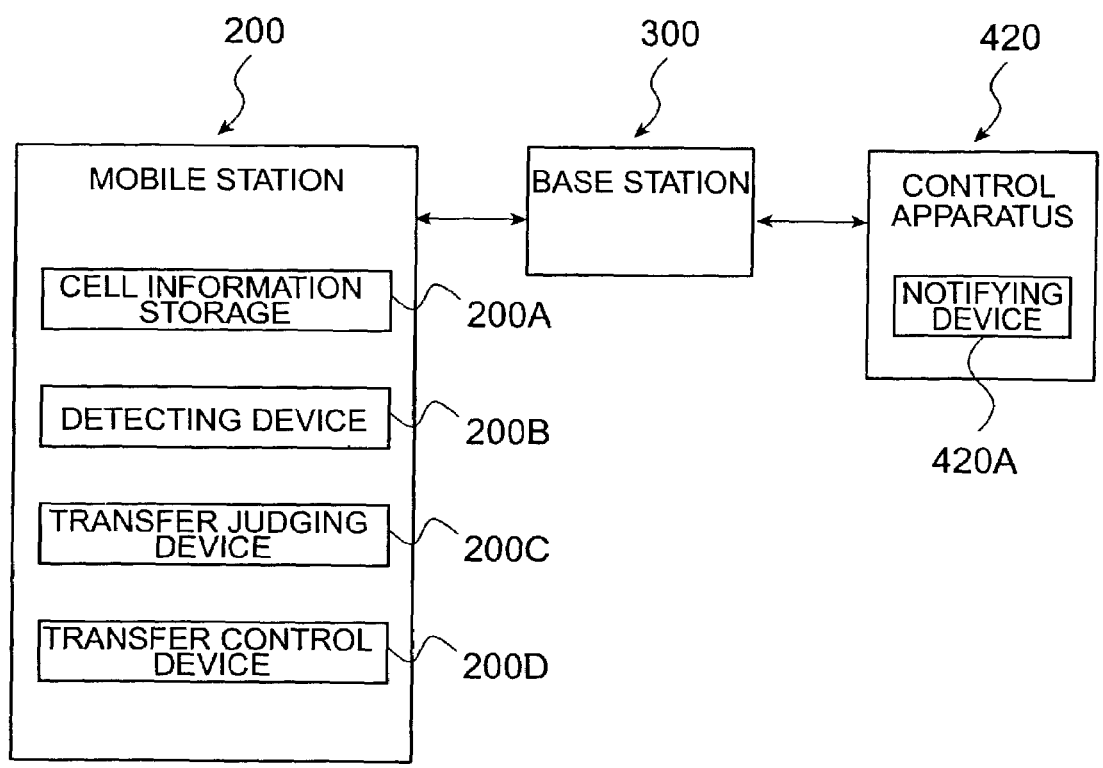
FIG. 6 is a functional block diagram of the principal elements in the mobile station transfer control system.

FIG. 6 is a functional block diagram of the principal elements in the mobile station transfer control system 1. As shown in FIG. 6, the control apparatus 420 is provided with a notifying device 420A for notifying the mobile station 200 of cell information indicating whether the mobile station is transferable to a cell while maintaining the current cellular mobile communication system, about each of surrounding cells. The mobile station 200 is provided with a cell information storage 200A storing the cell information about each surrounding cell notified of by the notifying means 420A; a detecting device 200B for detecting the arrival of transfer timing from the present cell to a surrounding cell; a transfer judging device 200C for, when the arrival of the transfer timing is detected, judging whether the surrounding cell is a transferable cell to which the mobile station is transferable while maintaining the current cellular mobile communication system, based on the cell information stored in the cell information storage 200A; and a transfer control device 200D for performing such control that when the surrounding cell is the transferable cell, the mobile station transfers to the surrounding cell and that when the surrounding cell is not the transferable cell, the mobile station transfers to a cell of a cellular mobile communication system different from the current cellular mobile communication system.

Figure 7:
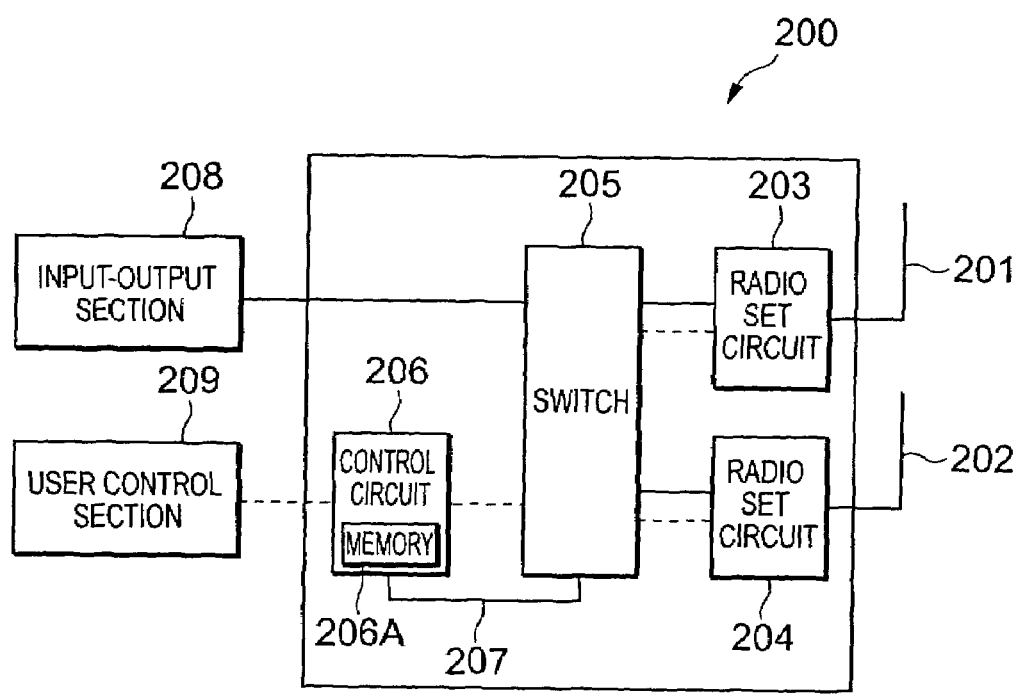
FIG. 7 is a block diagram showing a hardware configuration of the mobile station.

FIG. 7 shows a hardware configuration example of the mobile station 200 in the present embodiment. As shown in this FIG. 7, the mobile station 200 is constructed in a configuration including an antenna 201 for communication with the system A; an antenna 202 for communication with the system B; a radio set circuit 203 for modulating/demodulating and coding/decoding a radio wave sent to or received from the system A; a radio set circuit 204 for modulating/demodulating and coding/decoding a radio wave sent to or received from the system B; a switch 205 for switching between the systems; and a control circuit 206 connected to a user control section such as dial keys and others and configured to perform control of operation and monitoring of status of each component in the mobile station 200.

Among these, the control circuit 206 incorporates a built-in memory 206A and stores a broadcast message of FIG. 9 described hereinafter (broadcast information 401 and surrounding cell information 402) in the memory 206A. Namely, the memory 206A has the function of the cell information storage according to the present invention.

The radio set circuits 203, 204 separate a communication signal (indicated by solid lines in the drawing) from a control signal (indicated by dashed lines in the drawing) and are connected each to the switch 205. The switch 205 brings either one of the radio set circuits 203, 204 into a connected state according to a command received through a control line 207 from the control circuit 206, supplies a communication signal to an input-output section 208 such as a microphone, a speaker, and the like, and supplies a control signal via the control circuit 206 to the user control section 209 such as the dial keys and others.

The antennas 201, 202 are described as different antennas on the assumption that the system A and the system B use different frequency bands in the present embodiment, but it is also possible to use a common antenna where the system A and the system B use an identical frequency band.

The radio set circuits 203, 204 are also described as different radio set circuits on the assumption that the system A and the system B are configured in different modulation/demodulation schemes or coding/decoding schemes in the present embodiment, but it is also possible to use a common radio set circuit where the system A and the system B are configured in an identical modulation/demodulation scheme or coding/decoding scheme.

Figure 8:
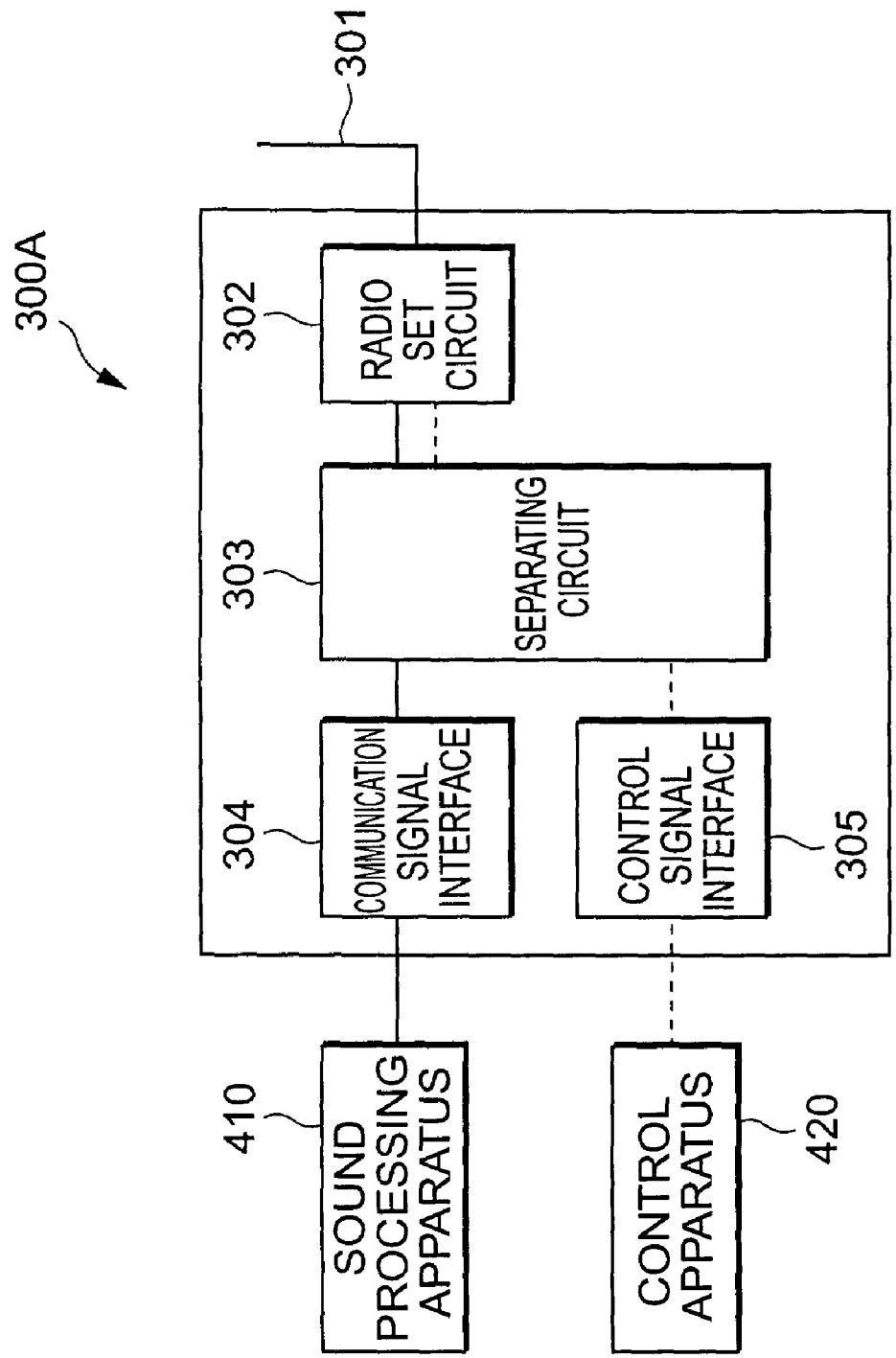
FIG. 8 is a block diagram showing a hardware configuration of the base station.

FIG. 8 shows a hardware configuration example of the base station 300A in the present embodiment. In the present embodiment, there is no substantial difference in structure between the base station 300A of the system A and the base station 300B of the system B and, therefore, the configuration example of the base station 300A of the system A is presented herein. It is noted that the configuration of the base station 300B of the system B is much the same as the configuration example of the base station 300A of the system A.

As shown in FIG. 8, the base station 300A is constructed in the configuration including an antenna 301 for communication with each mobile station; a radio set circuit 302 for modulating/demodulating a radio wave sent to or received from the mobile station; a communication signal interface 304 for sending or receiving a communication signal to or from the sound processing apparatus 410 in the base station 300; a control signal interface 305 for sending or receiving a control signal to or from the control apparatus 420; and a separating circuit 303 for separating a communication signal (indicated by solid lines in the drawing) and a control signal (indicated by dashed lines in the drawing) from the radio set circuit 302, from each other, supplying the communication signal to the communication signal interface 304, and supplying the control signal to the control signal interface 305.

Figure 9:
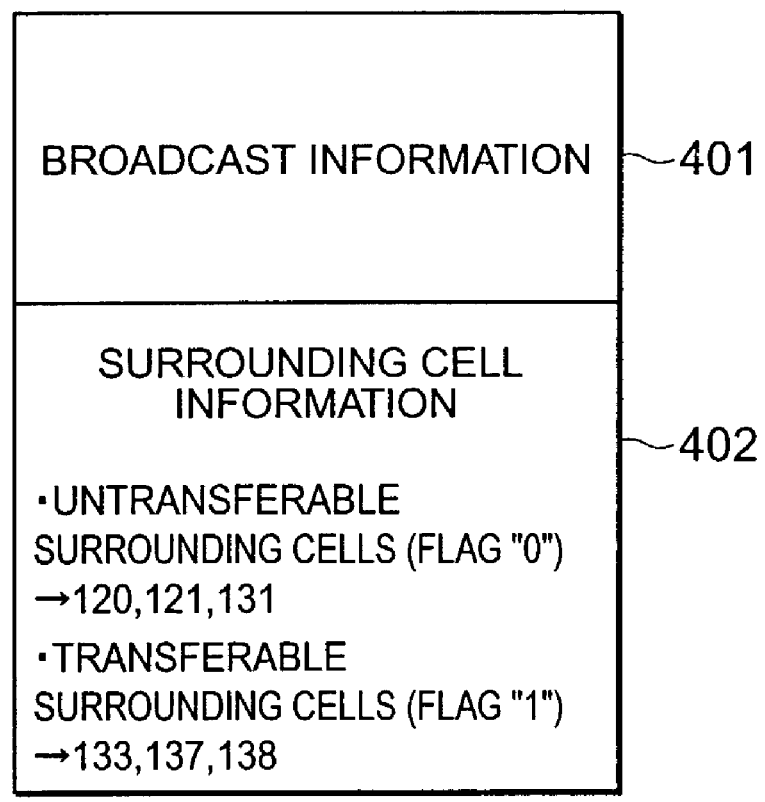
FIG. 9 is a diagram showing the broadcast information and surrounding cell information preliminarily sent to and stored at the mobile station on standby or in communication in the cell 132 of FIG. 4B.

FIG. 9 shows the broadcast message sent to the mobile station 200 (FIG. 7) on standby or in communication in the cell 132 belonging to the system B of FIG. 4B in the present embodiment. Although this FIG. 9 shows an example of the broadcast message in the cell 132, the broadcast messages in the other cells belonging to the system B are also similar thereto.

The broadcast information 401 in FIG. 9 includes codes of pilot channels in the respective surrounding cells 120, 121, 131, 133, 137, and 138 for the mobile station 200 to monitor reception levels thereof. The other information included in the broadcast information 401 is irrelevant to the present invention and the description thereof is omitted herein.

In the present embodiment, the broadcast message sent to the mobile station 200 also includes the surrounding cell information 402 in addition to the broadcast information 401. This surrounding cell information 402 is information indicating whether the mobile station 200 is transferable to each surrounding cell around the cell 132 while maintaining the presently belonging system. The surrounding cell information 402 herein is configured, for example, as follows: according to a predetermined rule of setting a flag "1" for a "transferable surrounding cell" and setting a flag "0" for an "untransferable surrounding cell," these flags "1" and "0" are given to each of the surrounding cells 120, 121, 131, 133, 137, and 138 in the same order as the code sequence of pilot channels included in the broadcast information 401, so as to arrange the flags as "0", "0", "0", "1", "1" and "1".

Figure 10:
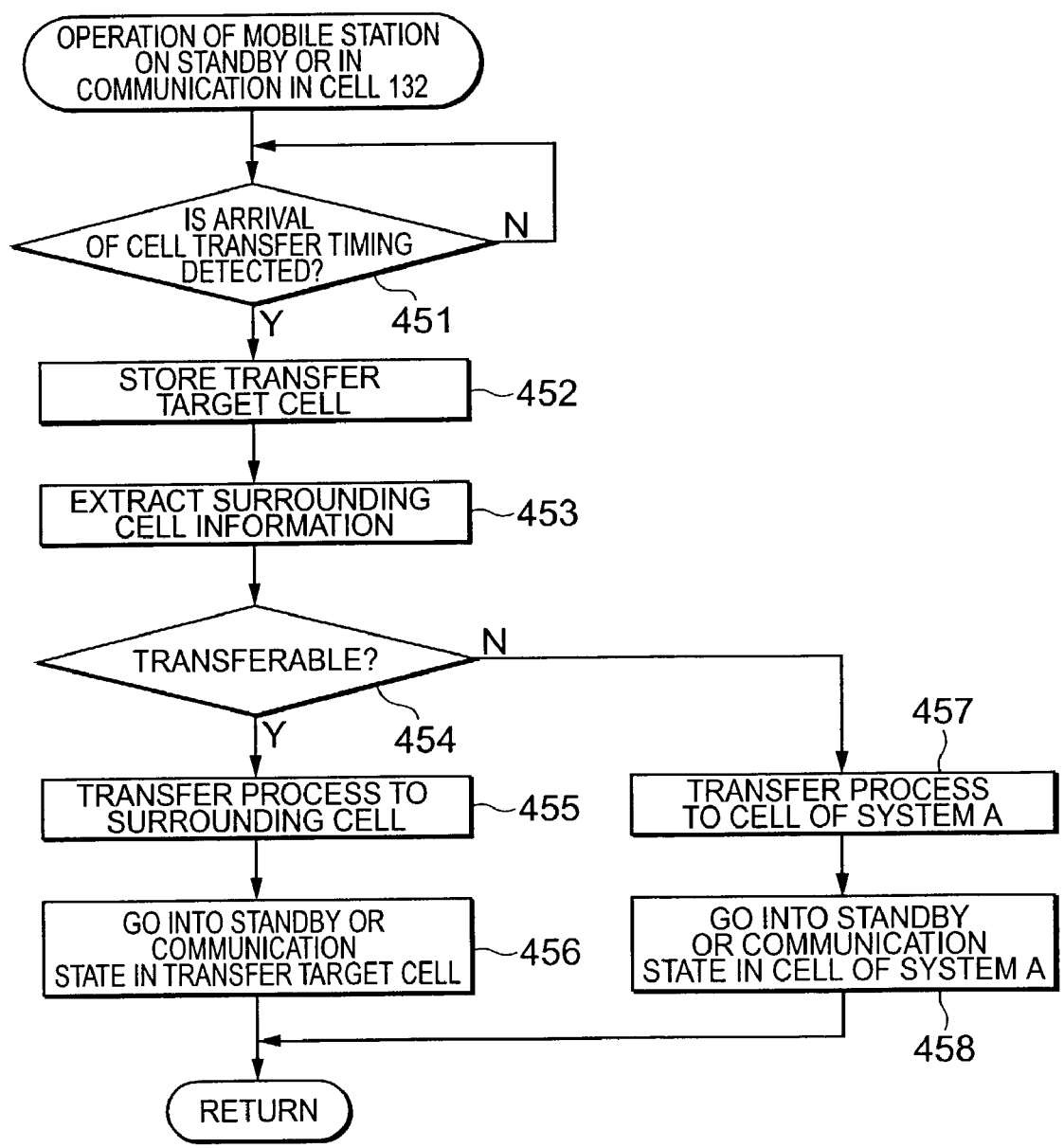
FIG. 10 is a flowchart showing the processing of the mobile station on standby or in communication in the cell 132 of FIG. 4B.

The following will describe the operation of the mobile station 200 on standby or in communication in the cell 132 on the basis of FIG. 10. FIG. 10 shows a flowchart of the operation executed at the mobile station 200 under control of the control circuit 206, and a flowchart of operation at a mobile station on standby or in communication in any cell out of the cells 133 to 138 is also similar thereto. The present flowchart is described by extracting the operation of the mobile station associated with the substance of the present invention, and excludes some part about the general operation of the mobile station including PDC and the like.

It is assumed that the mobile station 200 on standby or in communication in the cell 132 stores in the memory 206A of the control circuit 206, the surrounding cell information 402 about each of the surrounding cells around the cell 132, which was preliminarily notified of by the base station 300. In this state the mobile station 200 determines whether the arrival of cell transfer timing is detected, at step 451 in FIG. 10. When it is determined at step 451 that the arrival of cell transfer timing is detected, a transition is made to step 452 to store information about a transfer target cell. When it is determined on the other hand that the arrival of cell transfer timing is not detected yet, the determining process at step 451 is again performed. The process at step 451 corresponds to the detecting means according to the present invention.

Step 453 is to extract from the surrounding cell information 402 of FIG. 9, the information about whether the transfer target cell stored at step 452 is a transferable surrounding cell or an untransferable surrounding cell. The next step 454 is to judge whether the transfer target cell is a transferable surrounding cell or an untransferable surrounding cell, based on the extracted information. The process at step 454 corresponds to the judging means according to the present invention.

When the result of the judgment is that the transfer target cell is a transferable surrounding cell, a transition is made to step 455 to execute the transfer process including establishment of synchronization in the transfer target cell and others, and thereafter a transition is made to step 456 to go into a standby or communication state in the transfer target cell, followed by return from the processing in FIG. 10.

On the other hand, when the result of the judgment at step 454 is that the transfer target cell is an untransferable surrounding cell, a transition is made to step 457 to carry out a transfer process to a cell with the highest reception level among the cells with their respective reception levels preliminarily being monitored, out of the cells of the system A different from the current system B (e.g., a process of establishing synchronization in the pertinent cell, and others), and thereafter a transition is made to step 458 to go into a standby or communication state in the cell of the system A, followed by return from the processing in FIG. 10. The processes at step 455 and at step 457 correspond to the transfer control means according to the present invention.

The above operation makes it feasible to judge whether the transfer target cell is a transferable cell to which the mobile station is transferable while maintaining the current system, based on the surrounding cell information, prior to execution of the transfer to the transfer target cell and to securely perform the transfer to the cell actually used for standby or communication and the direct transfer to the cell of the different cellular mobile communication system, based on the result of the judgment. For this reason, it is feasible to circumvent waste processing such as the transfer process to the cell not used for standby or communication in practice, the synchronization establishing process, and the broadcast message receiving process and, thereby, to decrease the communication down time and the power consumption of the mobile station.

Since step 457 in FIG. 10 is configured to perform such control that when the transfer target cell is not a transferable cell, the mobile station transfers to the cell with the highest reception level out of the cells of the system different from the current system, the mobile station is able to continue the mobile communication in the environment with the better reception level even in the case of the direct transfer to the cell of the different system.

FIG. 10 excludes the illustration about the transfer process method from the system B to the cell of the system A, because it is irrelevant to the present invention.

[Second Embodiment]

The geographically overlapping service areas of two cellular mobile communication systems in the second embodiment will be schematically described on the basis of FIGS. 4A and 4B. The service area 10 of the system A consists of the cell 101 to the cell 119. The service area 20 of the system B consists of the cell 120 to the cell 138. These service areas geographically overlap each other in whole or in part. Among these cells, the cells 101 to 119 of the system A and the cells 132 to 138 of the system B are set as cells that can offer the service to both the dedicated mobile stations and the common mobile stations (which will be referred to hereinafter as "common cells"). Namely, in the cells 101 to 119, the communication resources of the system A can be allocated to the dedicated mobile stations to the system A, and to the common mobile stations. In the cells 132 to 138, similarly, the communication resources of the system B can also be allocated to the dedicated mobile stations to the system B, and to the common mobile stations. The cells 120 to 131 are set as cells that are not common cells (which will be referred to hereinafter as "ordinary cells"), and the communication resources of the system B are allocated only to the dedicated mobile stations to the system B.

Figure 11:
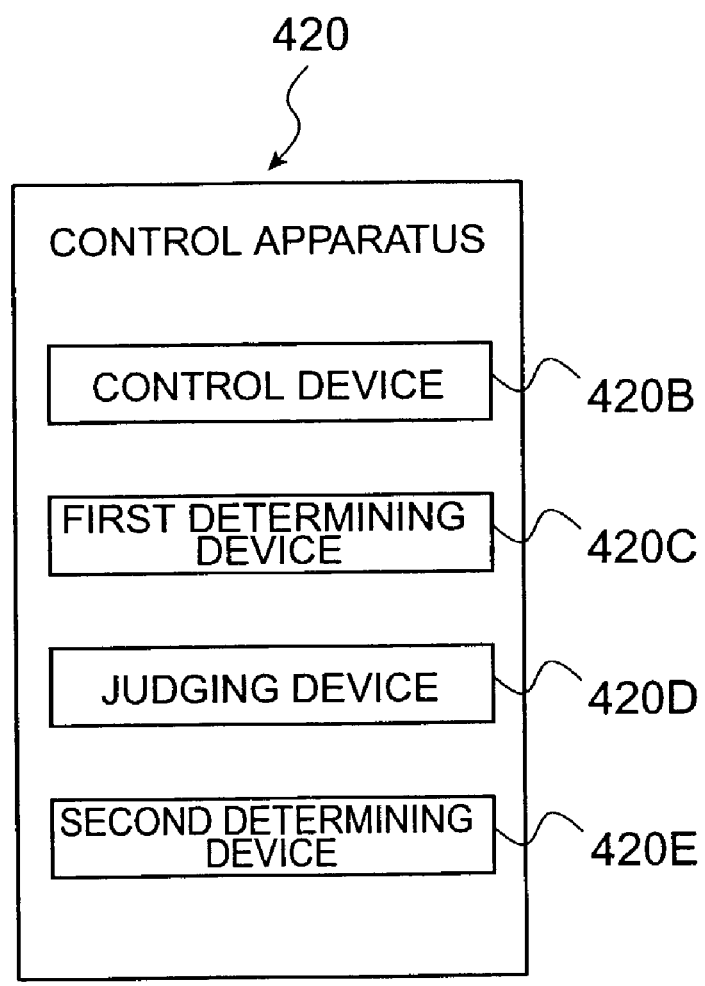
FIG. 11 is a functional block diagram of the control apparatus in the second embodiment.

FIG. 11 is a functional block diagram of the control apparatus 420 in the second embodiment. As shown in FIG. 11, the control apparatus 420 is comprised of a control device 420B for performing such control that in a common cell the communication resources of the cellular mobile communication system served therein are allocated to each of the dedicated mobile station and the common mobile station and that in an ordinary cell the communication resources of the cellular mobile communication system served in the ordinary cell are allocated to only the dedicated mobile station of the cellular mobile communication system; a first determining device 420C for, when the mobile station 200 transfers to another cell, determining a transfer target cell as a transfer target of the mobile station 200 within the current cellular mobile communication system whose service is under use at the mobile station 200; a judging device 420D for judging whether the mobile station 200 is a common mobile station and whether the transfer target cell is an ordinary cell; and a second determining device 420E for, when the mobile station 200 is a common mobile station and when the transfer target cell is an ordinary cell, determining a common cell of a cellular mobile communication system different from the current cellular mobile communication system, as a new transfer target cell.

The hardware configurations of the mobile station transfer control system, the base station, and the mobile station in the second embodiment each are much the same as the aforementioned configurations of FIG. 5 to FIG. 8 and the description thereof is thus omitted herein.

Figure 12:
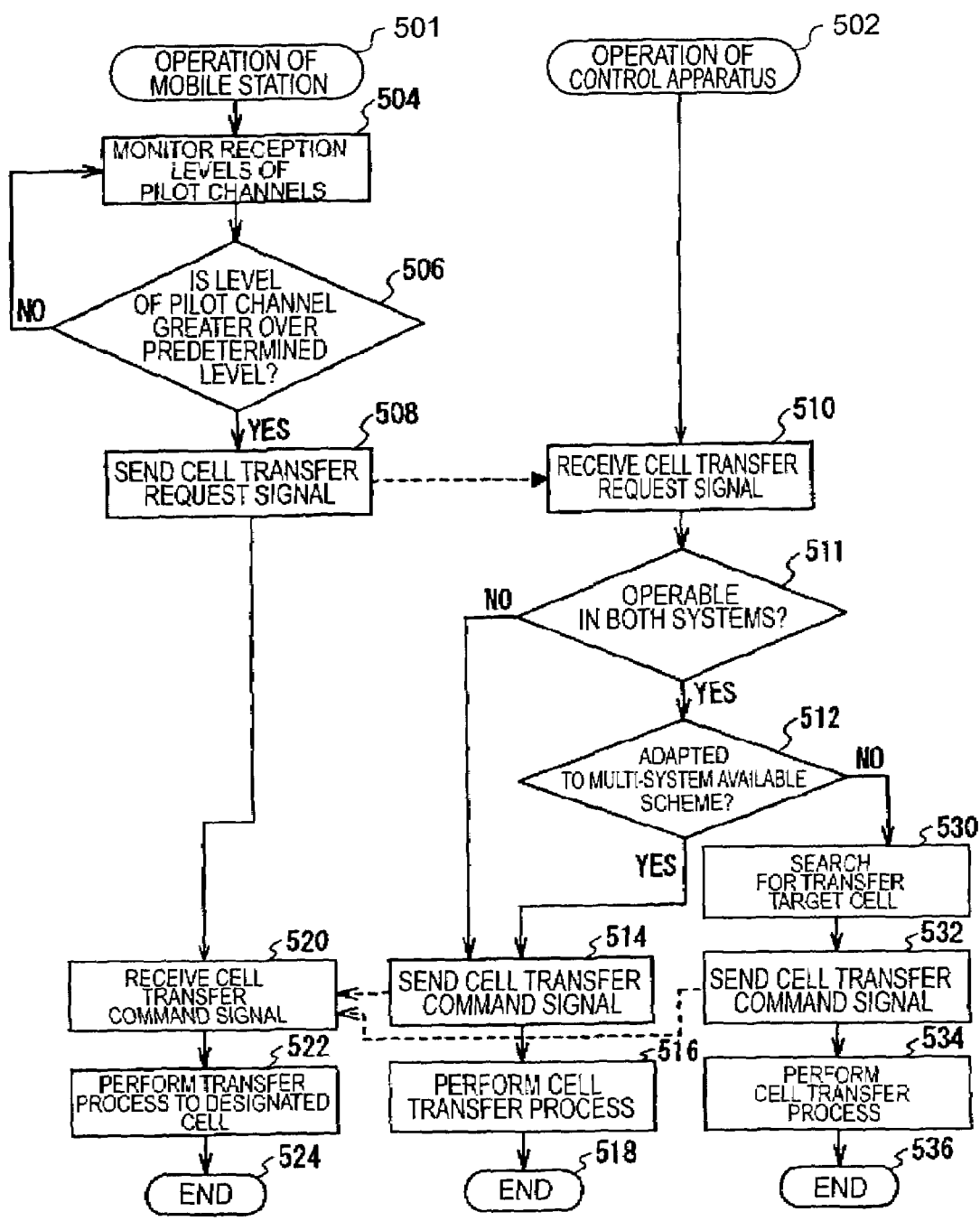
FIG. 12 is a flowchart showing the cell transfer control process in the second embodiment.

FIG. 12 is a flowchart showing the cell transfer control process executed in the mobile station transfer control system. The operation described below is carried out between the mobile station 200 shown in FIG. 5, and the base station 300 or the control apparatus 420 through the base station 300. Each action can be implemented by software or hardware according to necessity. It is assumed that the mobile station 200 under communication in the system B is in communication through the use of the communication resources of the system B in a common cell (e.g. the cell 137) (steps 501, 502 in FIG. 12). At step 504, the mobile station 200 receives pilot channels about the system B (the current cellular mobile communication system) transmitted from the base station 300 around the mobile station and monitors their reception levels. At step 506, the mobile station 200 checks whether a reception level of a pilot channel is higher over a predetermined value than the reception level in communication. When there is no higher level, the mobile station returns to step 504 to continue monitoring. When a reception level of a pilot channel is higher over the predetermined value than the reception level in communication, the mobile station 200 should better transfer to a cell generating the pilot channel, and thus at step 508, the mobile station 200 sends a cell transfer request signal to request the transfer to the cell, to the base station or the like (the base station 300 or the control apparatus 420 through the base station 300). The cell transfer request signal includes an identification code (cell identification code) of the base station 300 in charge of the cell as a transfer target.

At step 510, the cell transfer request signal issued from the mobile station 200 is routed to the base station 300 or via the base station 300 to the control apparatus 420. At step 511, it is determined whether the mobile station 200 is operable in the both cellular mobile communication systems. When the mobile station 200 is a dedicated mobile station to either one cellular mobile communication system, the operation flow goes to step 514. When it is a common mobile station, the operation flow goes to step 512. At step 512, the control apparatus 420 judges where the transfer target of the mobile station 200 is a common cell. The cell identification codes about the common cells are preliminarily stored in the storage device such as a nonvolatile memory or the like in the control apparatus 420, and the judgment at step 512 is carried out by comparing the cell identification code transmitted through the cell transfer request signal, with the cell identification codes preliminarily stored in the storage device. When the cell as a transfer target of the mobile station 200 is a common cell, the control apparatus 420 proceeds to step 514 to send to the mobile station 200 a cell transfer command signal to instruct the mobile station to transfer to the transfer target notified of thereby. Thereafter, the control apparatus performs a process of the cell transfer at step 516 and ends the operation at step 518. The mobile station 200 receives the cell transfer command signal at step 520, performs a process for the transfer to the designated cell at step 522, and ends the process of the cell transfer at step 524. In this manner, the mobile station 200 under communication in the system B can continuously establish communication through the use of the communication resources of the current system B in the case of the transfer from a common cell to another common cell.

Incidentally, when it is determined at step 512 that the cell as a transfer target of the mobile station 200 is not a common cell, the control apparatus proceeds to step 530 to search for a transfer target of the mobile station 200 about the system A different from the current system B. This is carried out, for example, based on the magnitude of reception levels of pilot channels in the system A, received from the base station 300 around the mobile station by the mobile station 200; for example, the base station 300A concerning the system A generating the strongest pilot channel is selected as a base station of the transfer target. The control apparatus 420 may be configured to receive the pilot channels in the system A, prior to the reception of the cell transfer request signal from the base station 200, or to receive them after the reception of the cell transfer request signal. Along with a cell identification code about the base station thus found, a cell transfer command signal is sent to the mobile station 200 at step 532. Thereafter, the control apparatus performs a process of the cell transfer at step 534 and ends the operation at step 536. On the other hand, the mobile station 200 receives the cell transfer command signal at step 520, performs the transfer process to the cell found at step 530, and ends the process of the cell transfer at step 524. In this case, different from the aforementioned case, the mobile station 200 under communication in the system B transfers, for example, from the common cell 134 to the cell 105 of the system A and is thus able to continue the communication through the use of the communication resources of the system A instead of the system B.

As described above, the control apparatus 420 for control over the base stations 300 may be configured as a control device common to the both cellular mobile communication systems, or as separate control devices for the respective cellular mobile communication systems. The common control device is preferable in terms of lump management of the system and the like. In the former case of the common control device, the common control device executes the processing of the control apparatus starting from step 502. In the latter case, each control device also needs to perform all the processing of the control apparatus starting from step 502, but is different in partial charge on the occasion of continuing communication along with change between the cellular mobile communication systems. In this case the system may be arranged as follows. The control device of the cellular mobile communication system in charge of the current communication performs the determination of the mobile station 200 and the transfer target and instructs the control device of the cellular mobile communication system different from the cellular mobile communication system in charge of the current communication, to perform the process for the cell transfer. In the aforementioned processing case, the control device of the system B performs the processing from step 502 through steps 510, 511, 512, and 530 to step 532 and instructs the control device of the system A to allocate the communication resources of the system A to the mobile station 200. According to the instruction, the control device of the system A allocates the communication resources to the mobile station 200. This configuration of the separate control devices is preferable from the viewpoint of readily substantiating the present invention in the existing systems.

Figure 1:
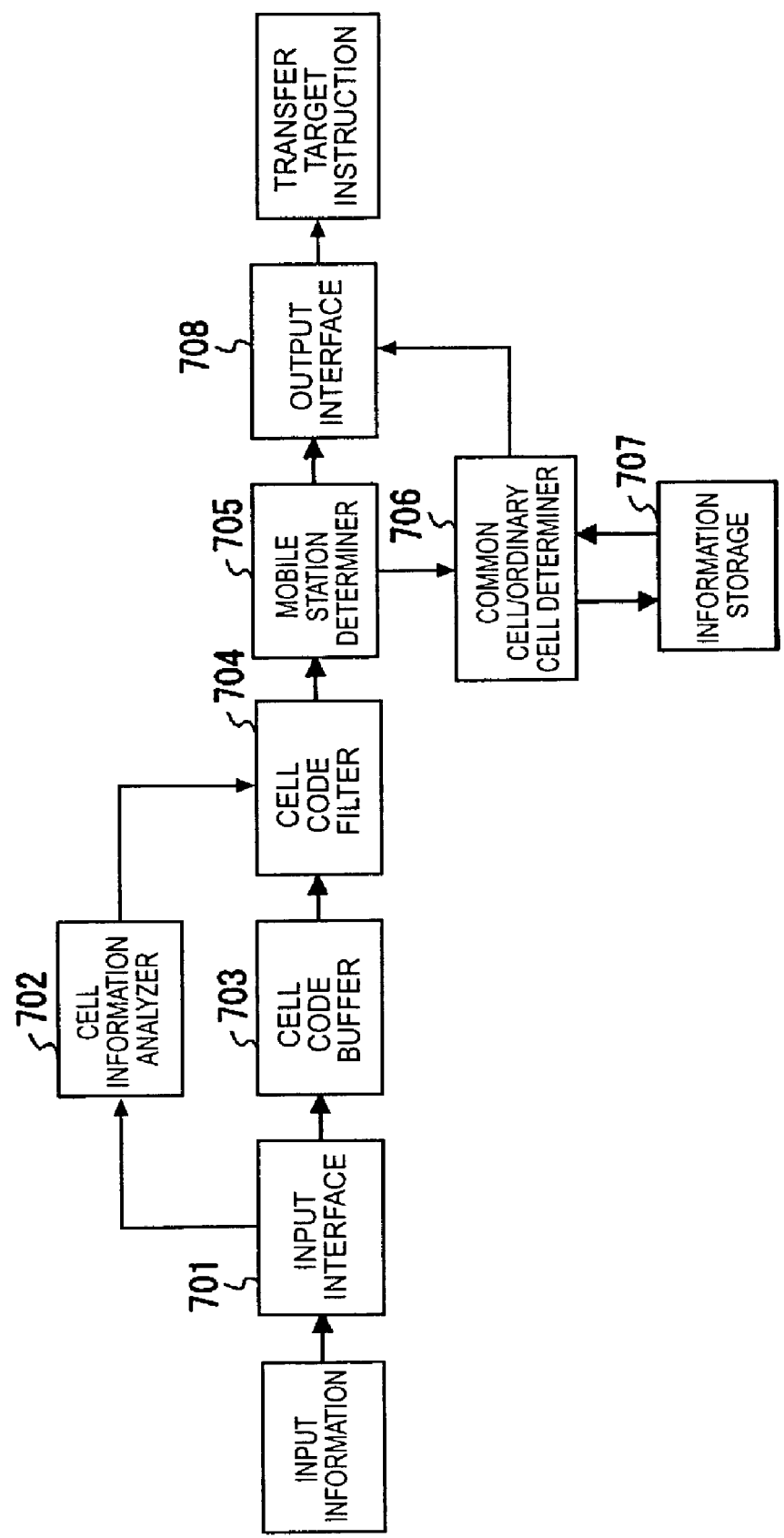
FIG. 1 is a functional block diagram for searching for a transfer target cell of a mobile station in the conventional multi-system available scheme.
Figure 2:
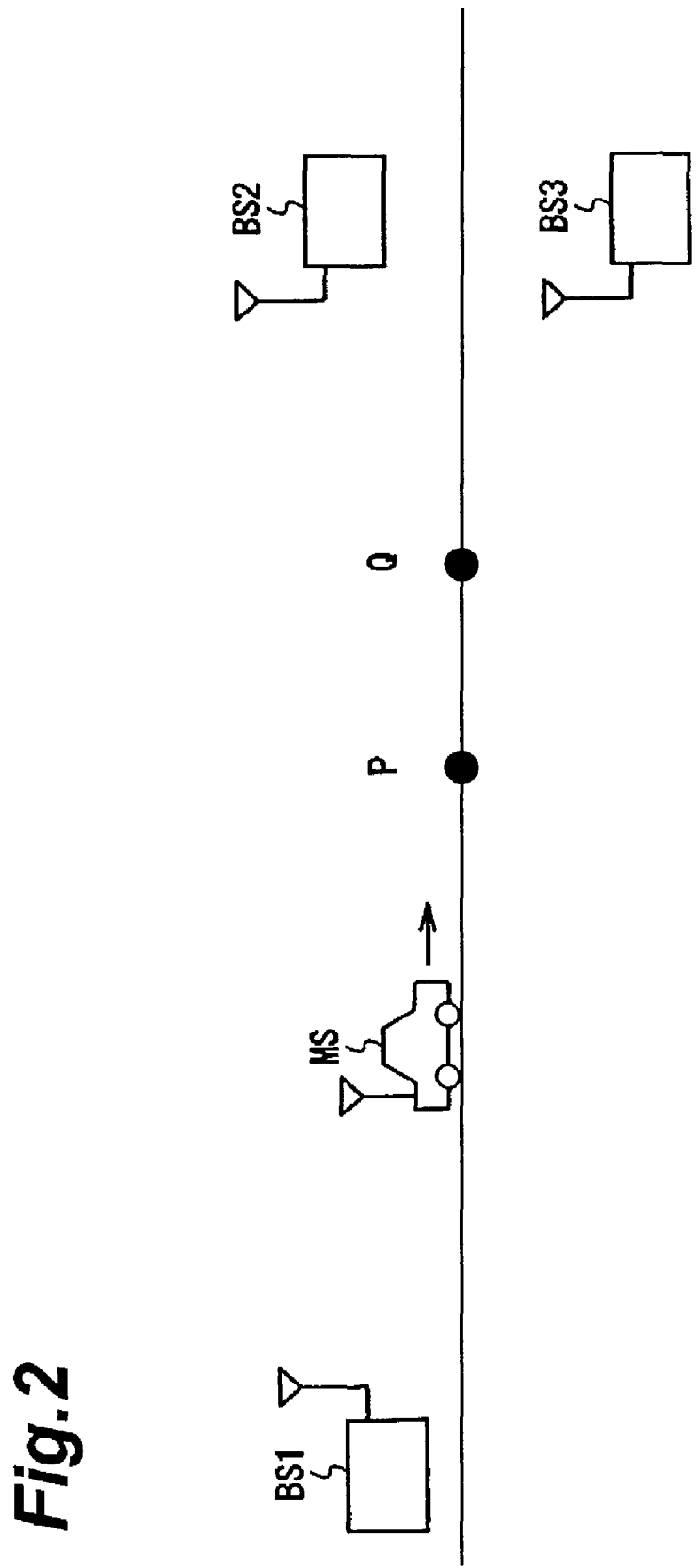
FIG. 2 is a schematic diagram for explaining the problems in the conventional multi-system available scheme.
Figure 13:
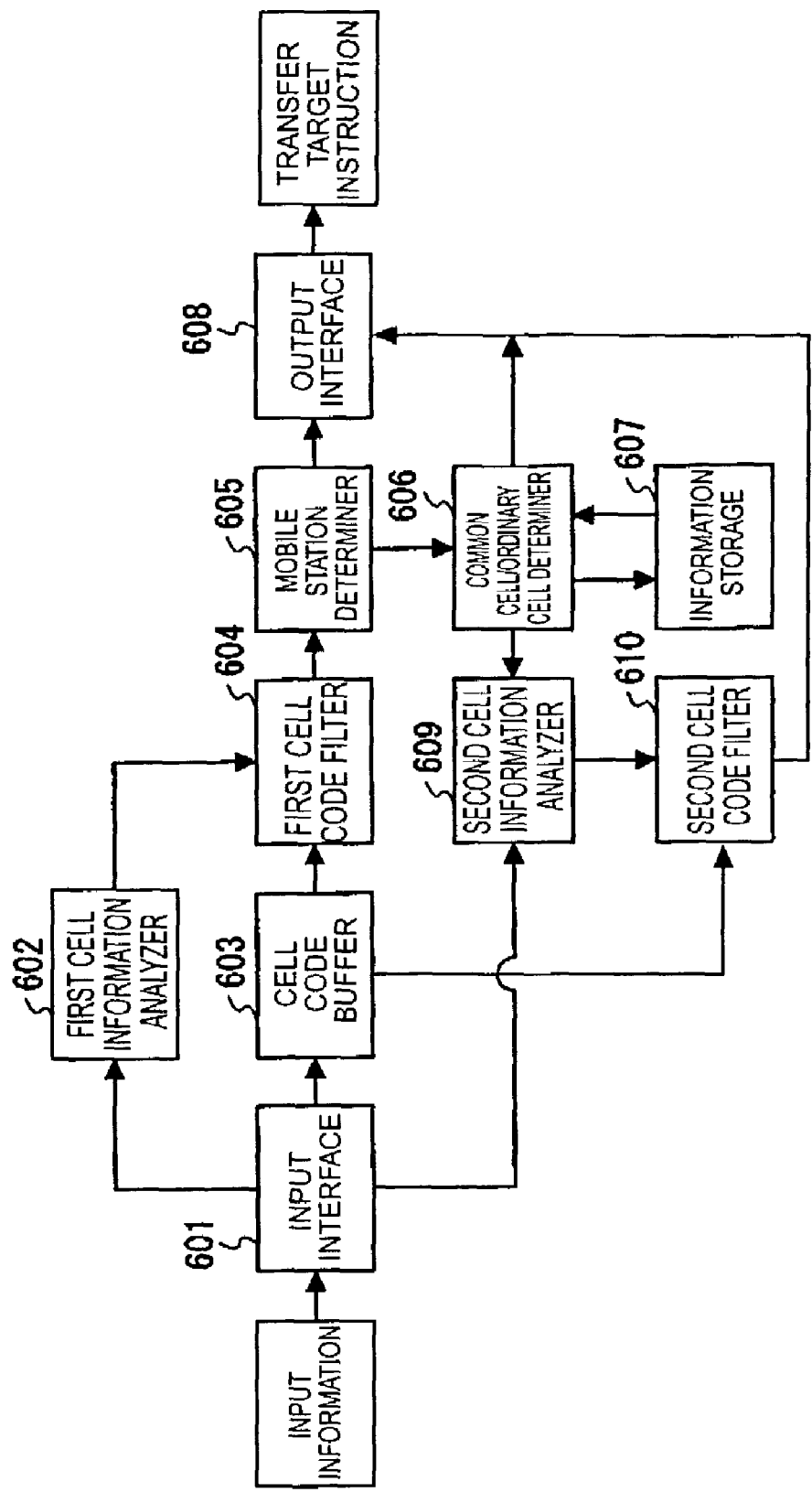
FIG. 13 is a functional block diagram for searching for a transfer target cell of the mobile station in the multi-system available scheme in the second embodiment.

FIG. 13 is a functional block diagram for searching for a cell as a transfer target (handover destination) of the mobile station 200 in the multi-system available scheme according to the present invention. Just as in the functional block diagram shown in FIG. 1, the processes shown in this functional block diagram are carried out by the control apparatus 420 exercising control over each base station 300. First, the input information received from the mobile station 200 is fed into an input interface 601. This input information includes, for example, ① an identification number of the mobile station, ② cell identification codes and reception levels of pilot channels from surrounding cells about a cellular mobile communication system currently used for communication, ③ cell identification codes and reception levels of pilot channels from surrounding cells about a cellular mobile communication system not used for communication, and so on. When the mobile station 200 is a device dedicated to either one cellular mobile communication system, the above input information does not include the information about the other cellular mobile communication system. Among the input information, the reception levels of pilot channels about the cellular mobile communication system currently used for communication are provided to a first cell information analyzer 602. Among the input information, the reception levels of pilot channels about the cellular mobile communication system not used for communication are provided to a second cell information analyzer 609. This is especially different from the prior art. The cell identification codes are provided to a cell code buffer 603. A first cell code filter 604 selects a cell with the strongest reception level in the cellular mobile communication system presently used for communication, as a transfer target of the mobile station 200. This is especially different from the prior art. A mobile station determiner 605 checks whether the mobile station 200 is operable in the both cellular mobile communication systems. When the mobile station 200 is a dedicated mobile station to one cellular mobile communication system, a command to instruct the mobile station to transfer to the cell specified at the first cell code filter 604 is dispatched through an out put interface 608. When the mobile station 200 is a common mobile station, a common cell/ordinary cell determiner 606 further checks whether the cell as a transfer target is a common cell or an ordinary cell. An information storage 607 coupled to the common cell/ordinary cell determiner 606 stores the information about which cell is a common cell. When the result of the check is that the cell as a transfer target is a common cell, the cell specified as a transfer target at the first cell code filter 604 is approved as an actual transfer target and an output signal to permit the transfer to the cell is dispatched through the output interface 608. When the result of the check is on the other hand that the cell as a transfer target is not a common cell, the transfer to the cell is not permitted. In this case, a cell code filter 610 selects a cell with the strongest reception level in the cellular mobile communication system not used for communication, as a transfer target of the mobile station 200 and informs the output interface 608 of it. The output interface 608 outputs a command to instruct the mobile station to transfer to the cell specified at the second cell code filter 610.

The operation described above will be summarized in more specific manner.

It is first assumed that the mobile station 200 of FIG. 5 is under communication through the use of the communication resources of the system B in the cell 137 adapted to the both systems, indicated by hatching in FIG. 4B. The mobile station 200 monitors the pilot channels from the surrounding cells 120, 132, 138, 136, 128, 129, 130, and 131. When the mobile station 200 moves toward the cell 138, the reception level of the pilot channel from the cell 138 becomes higher over the predetermined value than the reception level in communication and the mobile station sends a cell transfer request signal to the control apparatus 420. The cell transfer request signal includes an identification code of the base station of the cell 138 as a transfer target. Receiving the cell transfer request signal, the control apparatus 420 compares the identification code thus notified of, with the contents preliminarily stored in the memory device and determines that the cell 138 as a transfer target is a common cell. Then the control apparatus 420 sends a cell transfer command signal to permit the transfer to the cell 138, to the mobile station 200, and the mobile station 200 and the base station or the like perform the processing for the cell transfer. The mobile station 200 continuously carries on the communication through the use of the communication resources of the system B. On the other hand, when the mobile station 200 moves toward the cell 130, the control apparatus 420 compares the notified identification code with the contents preliminarily stored in the storage device, and determines that the transfer target is not a common cell. The control apparatus 420 selects, for example, a cell with the strongest reception level as a transfer target cell, based on the reception levels of pilot channels about the system A, for the mobile station 200. Suppose the cell selected in this way is, for example, the cell 111 in FIG. 4A. Then the control apparatus 420 sends a cell transfer command signal to permit the transfer to the cell 111, to the mobile station 200, and the mobile station 200 and the base station or the like perform the processing for the cell transfer. In this way, the mobile station 200 comes to continue communication through the use of the communication resources of the system A.

As a configuration of the mobile station transfer control system, it is also possible to employ a configuration comprehensively including the components of the first embodiment and the components of the second embodiment described above.

In the last place, a cell transfer control program according to the present invention will be described. The cell transfer control program is recorded, for example, in a computer-readable storage medium. The storage medium herein is a medium that can induce states of change in energy such as magnetism, light, electricity, or the like according to the description contents of the program against a reading device in the hardware resources of a computer and transmit the description contents of the program to the reading device in a format of signals corresponding to the change states. Such storage media include, for example, those detachably mounted on a computer (including the mobile station), such as IC (Integrated Circuit) cards, magnetic disks, optical disks, CD-ROM, and the like; HD (Hard Disk) fixedly installed in the computer; nonvolatile semiconductor memories like firmware or the like integrally fixed; and so on.

The above program may be configured so that part or all thereof is sent from another device through transmission media such as communication lines or the like and received by the mobile station according to the present invention to be stored. The above program may also be configured to be transmitted from the mobile station according to the present invention through the transmission media to another mobile station to be installed there.

According to the present invention, as described above, the mobile station is able to judge, prior to transfer to a surrounding cell, whether the surrounding cell is a transferable cell to which the mobile station is transferable while maintaining the current cellular mobile communication system, based on the cell information, and securely achieve the transfer to the cell actually used for standby or communication and the direct transfer to the cell of the different cellular mobile communication system, based on the result of the judgment, whereby it is feasible to avoid waste processing including the transfer process to the cell not used actually for standby or communication, the synchronization establishing process, and the broadcast message receiving process and, thereby, to decrease the communication down time and the power consumption of the mobile station.

According to the present invention, the first determination of the transfer target cell is to determine the transfer target cell within the current cellular mobile communication system, different from the determination of the transfer target cell between a plurality of cellular mobile communication systems as in the prior art, whereby it is feasible to overcome the conventional problem that handover is made at an inappropriate place in terms of the effective utilization of the communication resources and to perform such control that the common mobile station achieves handover under the same condition (i.e., at the same handover place) as the dedicated mobile station. This makes it feasible to secure the adequate distance between cells using the same frequency and maintain the reception quality of the mobile station at satisfactory levels during handover periods.

What is claimed is:

1. A mobile station transfer control system comprising a control apparatus for control over a plurality of cellular mobile communication systems and a mobile station present in a cell under the control of the control apparatus, and constructed in a configuration in which service areas of the respective cellular mobile communication systems regionally overlap each other at least in part, wherein said control apparatus comprises:
notifying means for notifying said mobile station of cell information indicating whether the mobile station is transferable to a cell while maintaining a current cellular mobile communication system, about each of surrounding cells located around said present cell, and wherein said mobile station comprises:
a cell information storage for storing the cell information about each surrounding cell notified of by said notifying means;
detecting means for detecting the arrival of transfer timing from the present cell to a surrounding cell;
transfer judging means for, when said detecting means detects the arrival of the transfer timing, judging whether said surrounding cell is a transferable cell to which the mobile station is transferable while maintaining the current cellular mobile communication system, based on the cell information stored in said cell information storage; and
transfer control means for performing such control that when said surrounding cell is said transferable cell, the mobile station transfers to said surrounding cell and that when said surrounding cell is not said transferable cell, the mobile station transfers to a cell of a cellular mobile communication system different from the current cellular mobile communication system.

2. The mobile station transfer control system according to claim 1, wherein said transfer control means performs such control that when said surrounding cell is not said transferable cell, the mobile station transfers to a cell with the highest reception level out of cells of said different cellular mobile communication system.

3. A cell transfer control method in a mobile station transfer control system comprising a control apparatus for control over a plurality of cellular mobile communication systems, and a mobile station present in a cell under the control of the control apparatus, and constructed in a configuration in which service areas of the respective cellular mobile communication systems regionally overlap each other at least in part, the cell transfer control method comprising:

a notification step wherein said control apparatus notifies said mobile station of cell information indicating whether the mobile station is transferable to a cell while maintaining a current cellular mobile communication system, about each of surrounding cells located around said present cell;
a storage step wherein said mobile station stores the cell information about each surrounding cell notified of by said control apparatus, in a cell information storage;
a detection step wherein said mobile station detects the arrival of transfer timing from the present cell to a surrounding cell;
a judgment step wherein when the arrival of the transfer timing is detected, said mobile station judges whether said surrounding cell is a transferable cell to which the mobile station is transferable while maintaining the current cellular mobile communication system, based on the cell information stored in said cell information storage; and
a transfer control step wherein when said surrounding cell is said transferable cell, said mobile station transfers to said surrounding cell and wherein when said surrounding cell is not said transferable cell, the mobile station transfers to a cell of a cellular mobile communication system different from the current cellular mobile communication system.

4. The cell transfer control method according to claim 3, wherein said transfer control step is to perform such control that when said surrounding cell is not said transferable cell, the mobile station transfers to a cell with the highest reception level out of cells of said different cellular mobile communication system.

5. A mobile station comprising:
a cell information storage for storing cell information notified of by a control apparatus for control over a plurality of cellular mobile communication systems service areas of which regionally overlap each other at least in part, said cell information indicating whether the mobile station is transferable to a cell while maintaining a cellular mobile communication system of the control apparatus, about each of surrounding cells;

detecting means for detecting the arrival of transfer timing from a present cell to a surrounding cell;

transfer judging means for, when said detecting means detects the arrival of the transfer timing, judging whether said surrounding cell is a transferable cell to which the mobile station is transferable while maintaining the current cellular mobile communication system, based on the cell information stored in said cell information storage; and transfer control means for performing such control that when said surrounding cell is said transferable cell, the mobile station transfers to said surrounding cell and that when said surrounding cell is not said transferable cell, the mobile station transfers to a cell of a cellular mobile communication system different from the current cellular mobile communication system.

6. The mobile station according to claim 5, wherein said transfer control means performs such control that when said surrounding cell is not said transferable cell, the mobile station transfers to a cell with the highest reception level out of cells of said different cellular mobile communication system.

7. A cell transfer control method at a mobile station, the cell transfer control method comprising:

a storage step of storing cell information notified of by a control apparatus for control over a plurality of cellular mobile communication systems service areas of which regionally overlap each other at least in part, said cell information indicating whether the mobile station is transferable to a cell while maintaining a cellular mobile communication system of the control apparatus, about each of surrounding cells;

a detection step of detecting the arrival of transfer timing from a present cell to a surrounding cell;

a judgment step of, when the arrival of the transfer timing is detected in said detection step, judging whether said surrounding cell is a transferable cell to which the mobile station is transferable while maintaining the current cellular mobile communication system, based on the stored cell information; and a transfer control step of performing such control that when said surrounding cell is said transferable cell, the mobile station transfers to said surrounding cell and that when said surrounding cell is not said transferable cell, the mobile station transfers to a cell of a cellular mobile communication system different from the current cellular mobile communication system.

8. The cell transfer control method at the mobile station according to claim 7, wherein said transfer control step is to perform such control that when said surrounding cell is not said transferable cell, the mobile station transfers to a cell with the highest reception level out of cells of said different cellular mobile communication system.

9. A cell transfer control program for making a built-in computer at said mobile station execute each of the steps in the cell transfer control method at the mobile station as set forth in claim 7.

10. A mobile station transfer control system comprising a control apparatus for control over a plurality of cellular mobile communication systems, and a mobile station present in a cell under the control of the control apparatus, said mobile station being classified either as a dedicated mobile station set to be able to utilize only service of one cellular mobile communication system or as a common mobile station set to be able to utilize service of two or more cellular mobile communication systems; and constructed in a configuration in which service areas of the respective cellular mobile communication systems regionally overlap each other at least in part, the mobile station transfer control system comprising:

control apparatus for performing such control that in a common cell set to be able to offer service to both the dedicated mobile station and the common mobile station, communication resources of a cellular mobile communication system served therein are allocated to each of the dedicated mobile station and the common mobile station and that in an ordinary cell not set as said common cell, communication resources of a cellular mobile communication system served in the ordinary cell are allocated to only the dedicated mobile station of said cellular mobile communication system;

first determining means for, when said mobile station transfers to another cell, determining a transfer target cell as a transfer target of the mobile station within a current cellular mobile communication system in which said mobile station utilizes service thereof;

judging means for judging whether said mobile station is a common mobile station and whether the transfer target cell determined by said first determining means is an ordinary cell; and second determining means for, when said mobile station is a common mobile station and when the transfer target cell determined by said first determining means is an ordinary cell, determining a common cell of a cellular mobile communication system different from the current cellular mobile communication system, as a new transfer target cell.

11. A control apparatus for allocating communication resources to a mobile station, said mobile station being classified either as a dedicated mobile station set to be able to utilize only service of one cellular mobile communication system out of a plurality of cellular mobile communication systems service areas of which regionally overlap each other at least in part or as a common mobile station set to be able to utilize service of two or more cellular mobile communication systems, the control apparatus comprising:

control means for performing such control that in a common cell set to be able to offer service to both the dedicated mobile station and the common mobile station, communication resources of a cellular mobile communication system served therein are allocated to each of the dedicated mobile station and the common mobile station and that in an ordinary cell not set as said common cell, communication resources of a cellular mobile communication system served in the ordinary cell are allocated to only the dedicated mobile station of said cellular mobile communication system;

first determining means for, when said mobile station transfers to another cell, determining a transfer target cell as a transfer target of the mobile station within a current cellular mobile communication system in which said mobile station utilizes service thereof;

judging means for judging whether said mobile station is a common mobile station and whether the transfer target cell determined by said first determining means is an ordinary cell; and second determining means for, when said mobile station is a common mobile station and when the transfer target cell determined by said first determining means is an ordinary cell, determining a common cell of a cellular mobile communication system different from the current cellular mobile communication system, as a new transfer target cell.

12. The control apparatus according to claim 11, said control apparatus being comprised of a control section common to at least two cellular mobile communication systems.

13. The control apparatus according to claim 11, said control apparatus being comprised of control sections of the respective cellular mobile communication systems for allocating communication resources of the respective cellular mobile communication systems.

14. An allocating method of communication resources in a mobile station transfer control system comprising a control apparatus for control over a plurality of cellular mobile communication systems, and a mobile station present in a cell under the control of the control apparatus, said mobile station being classified either as a dedicated mobile station set to be able to utilize only service of one cellular mobile communication system or as a common mobile station set to be able to utilize service of two or more cellular mobile communication systems; and constructed in a configuration in which service areas of the respective cellular mobile communication systems regionally overlap each other at least in part and in which said control apparatus performs such control that in a common cell set to be able to offer service to both the dedicated mobile station and the common mobile station, communication resources of a cellular mobile communication system served therein are allocated to each of the dedicated mobile station and the common mobile station and that in an ordinary cell not set as said common cell, communication resources of a cellular mobile communication system served in said ordinary cell are allocated to only the dedicated mobile station of said cellular mobile communication system, the method comprising:
- a transfer request step wherein the mobile station utilizing service of a first cellular mobile communication system sends a request for transfer to another cell, to said control apparatus;
- a first determination step wherein said control apparatus determines a transfer target cell as a transfer target of said mobile station within said first cellular mobile communication system;
- a judgment step wherein said control apparatus judges whether said mobile station is a common mobile station and whether the transfer target cell determined in said first determination step is an ordinary cell;
- a second determination step wherein when said mobile station is a common mobile station and when the transfer target cell determined in said first determination step is an ordinary cell, said control apparatus determines a common cell of a cellular mobile communication system different from said first cellular mobile communication system, as a new transfer target cell; and
- a different system resources allocation step wherein said control apparatus allocates communication resources of the cellular mobile communication system of said new transfer target cell to said mobile station.

15. The allocating method of communication resources according to claim 14, further comprising an identical system resources allocation step wherein when said mobile station is not a common mobile station or when the transfer target cell determined in said first determination step is not an ordinary cell, said control apparatus continuously allocates communication resources of said first cellular mobile communication system to the mobile station.

16. A mobile station transfer control system comprising a control apparatus for control over a plurality of cellular mobile communication systems, and a mobile station present in a cell under the control of the control apparatus, said mobile station being classified either as a dedicated mobile station set to be able to utilize only service of one cellular mobile communication system or as a common mobile station set to be able to utilize service of two or more cellular mobile communication systems; and constructed in a configuration in which service areas of the respective cellular mobile communication systems regionally overlap each other at least in part, wherein said control apparatus comprises:
notifying means for notifying said mobile station of cell information indicating whether the mobile station is transferable to a cell while maintaining a current cellular mobile communication system, about each of surrounding cells located around said present cell;
control means for performing such control that in a common cell set to be able to offer service to both the dedicated mobile station and the common mobile station, communication resources of a cellular mobile communication system served therein are allocated to each of the dedicated mobile station and the common mobile station and that in an ordinary cell not set as said common cell, communication resources of a cellular mobile communication system served in the ordinary cell are allocated to only the dedicated mobile station of said cellular mobile communication system;
first determining means for, when said mobile station transfers to another cell, determining a transfer target cell as a transfer target of the mobile station within a current cellular mobile communication system in which said mobile station utilizes service thereof;
judging means for judging whether said mobile station is a common mobile station and whether the transfer target cell determined by said first determining means is an ordinary cell; and
second determining means for, when said mobile station is a common mobile station and when the transfer target cell determined by said first determining means is an ordinary cell, determining a common cell of a cellular mobile communication system different from the current cellular mobile communication system, as a new transfer target cell; and wherein said mobile station comprises:
a cell information storage for storing the cell information about each surrounding cell notified of by said notifying means;
detecting means for detecting the arrival of transfer timing from the present cell to a surrounding cell;
transfer judging means for, when said detecting means detects the arrival of the transfer timing, judging whether said surrounding cell is a transferable cell to which the mobile station is transferable while maintaining the current cellular mobile communication system, based on the cell information stored in said cell information storage; and
transfer control means for performing such control that when said surrounding cell is said transferable cell, the mobile station transfers to said surrounding cell and that when said surrounding cell is not said transferable cell, the mobile station transfers to a cell of a cellular mobile communication system different from the current cellular mobile communication system.

* * * * *